United States Patent
Yasuda et al.

(10) Patent No.: US 9,219,865 B2
(45) Date of Patent: *Dec. 22, 2015

(54) IMAGING APPARATUS CAPABLE OF DETECTING AND DISPLAYING INFORMATION WITH RESPECT TO AN INCLINE THEREOF

(71) Applicant: RICOH COMPANY, LTD., Tokyo (JP)

(72) Inventors: Takuroh Yasuda, Shinagawa-ku (JP); Yohsuke Suzuki, Yokohama (JP); Atsushi Matsutani, Yokohama (JP); Takashi Maki, Yokohama (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/472,466

(22) Filed: Aug. 29, 2014

(65) Prior Publication Data

US 2014/0368720 A1    Dec. 18, 2014

Related U.S. Application Data

(62) Division of application No. 13/307,020, filed on Nov. 30, 2011, now Pat. No. 8,860,866, and a division of application No. 12/212,962, filed on Sep. 18, 2008, now Pat. No. 8,089,549.

(30) Foreign Application Priority Data

Sep. 19, 2007 (JP) ................................. 2007-243138
Oct. 27, 2007 (JP) ................................. 2007-279727

(51) Int. Cl.
*H04N 5/222* (2006.01)
*H04N 5/228* (2006.01)
(Continued)

(52) U.S. Cl.
CPC ................................. *H04N 5/23293* (2013.01)

(58) Field of Classification Search
CPC ........... G03B 17/18; G03B 7/00; H04N 5/225
USPC ............. 348/208.99–208.12, 333.01–333.12; 396/53
See application file for complete search history.

(56) References Cited

U.S. PATENT DOCUMENTS 5,532,785 A    7/1996   Goto et al.
6,144,761 A   11/2000   Kaneko et al.
(Continued)

FOREIGN PATENT DOCUMENTS

EP    1154314 A2    11/2001
JP    11-352568 A   12/1999
(Continued)

*Primary Examiner* — Sinh Tran
*Assistant Examiner* — Selam Gebriel
(74) *Attorney, Agent, or Firm* — Dickstein Shapiro LLP

(57) ABSTRACT

An imaging apparatus including an incline detection device configured to detect an incline of the imaging apparatus, an image display device configured to display an image based on the image information, an incline computation device configured to compute an incline information that corresponds to a magnitude of the incline, an information storage device configured to store the incline information that is computed by the incline computation device, and a display processing device configured to display the image and an incline guide display corresponding to the incline information upon a screen of the image display device. The display processing device is configured to change a display format of the incline guide display in accordance with the magnitude of the incline.

9 Claims, 17 Drawing Sheets

(51) Int. Cl.
  *G03B 15/02* (2006.01)
  *H04N 5/232* (2006.01)

(56) References Cited

U.S. PATENT DOCUMENTS

| | | |
|---|---|---|
| 7,907,836 B2 | 3/2011 | Shinohara et al. |
| 7,948,548 B2 | 5/2011 | Caruhel et al. |
| 8,150,249 B2 | 4/2012 | Lui |
| 2003/0052985 A1 | 3/2003 | Oya et al. |
| 2003/0122945 A1 | 7/2003 | Muramatsu |
| 2003/0231243 A1* | 12/2003 | Shibutani ............... 348/207.99 |
| 2004/0212699 A1 | 10/2004 | Molgaard |
| 2005/0088546 A1 | 4/2005 | Wang |
| 2005/0117024 A1 | 6/2005 | Lee |
| 2005/0195308 A1 | 9/2005 | Miyashita |
| 2006/0064888 A1 | 3/2006 | Chen |
| 2006/0204232 A1 | 9/2006 | Weinberg et al. |
| 2007/0229695 A1 | 10/2007 | Kato |
| 2009/0067826 A1 | 3/2009 | Shinohara et al. |
| 2011/0228133 A1 | 9/2011 | Itoh |

FOREIGN PATENT DOCUMENTS

| | | |
|---|---|---|
| JP | 2001-074450 | 3/2001 |
| JP | 2004-343476 | 12/2004 |
| JP | 2006-285073 | 10/2006 |
| JP | 3896505 | 1/2007 |
| JP | 2007-174156 | 7/2007 |
| JP | 2007-212527 A | 8/2007 |

* cited by examiner

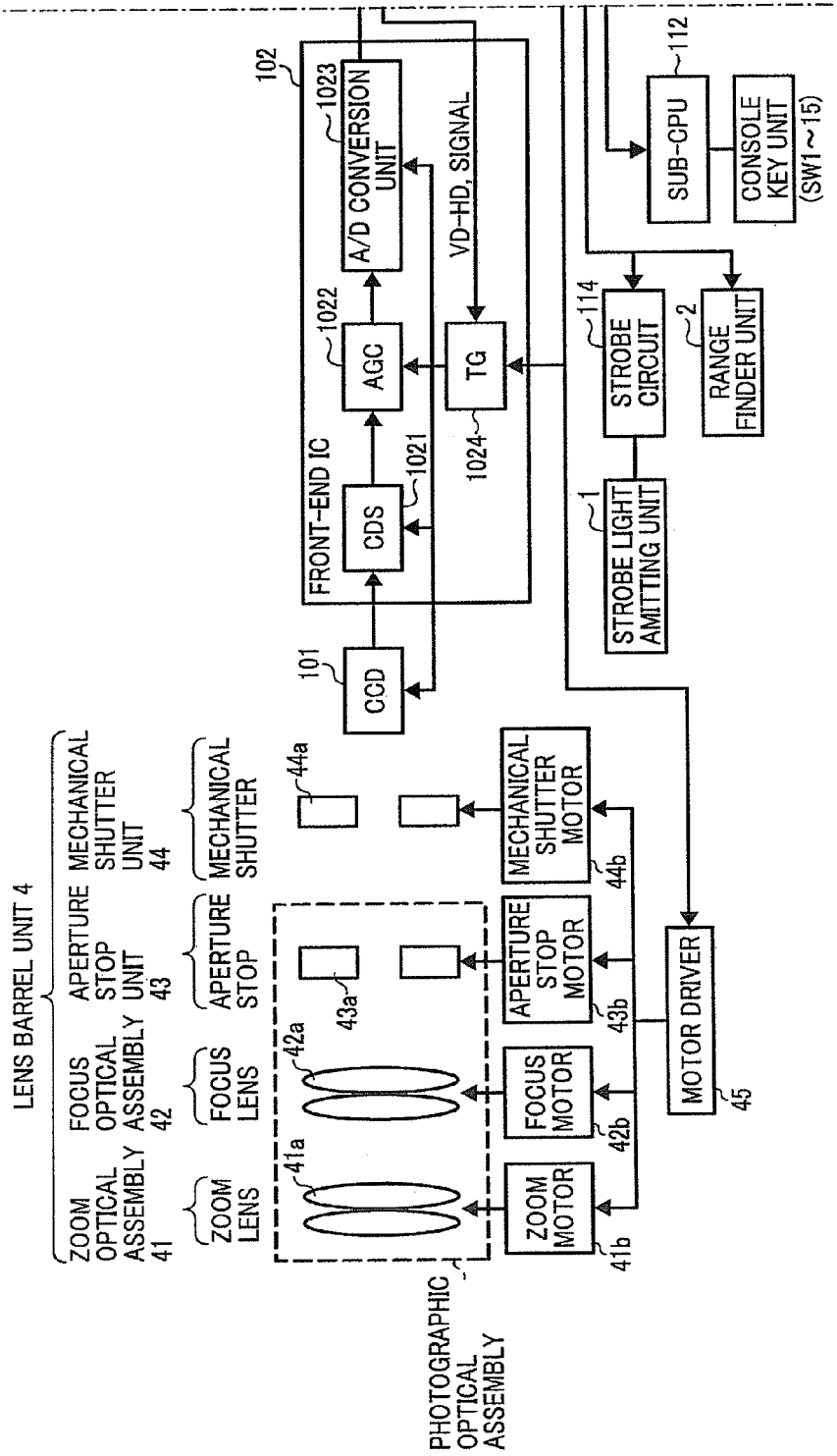

FIG. 3A
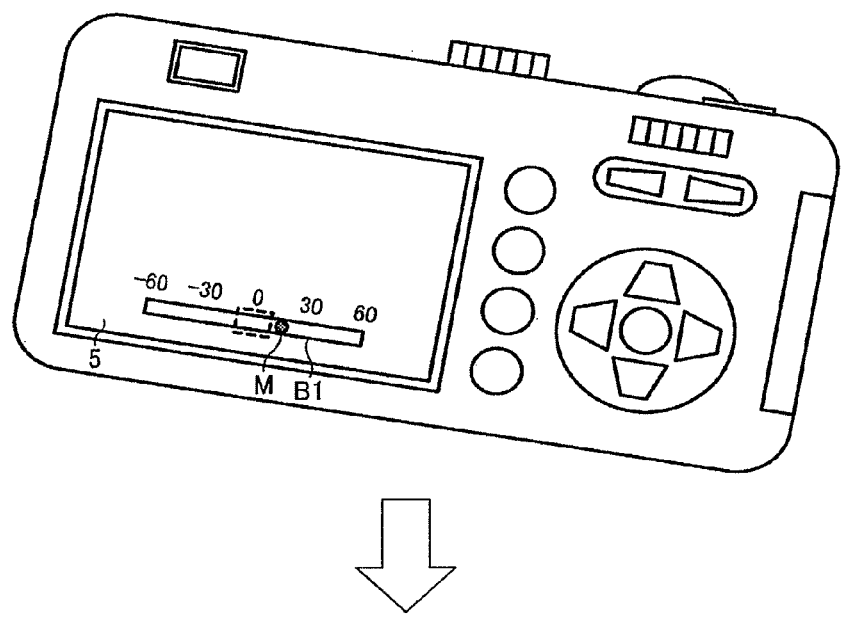
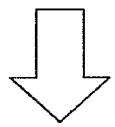
FIG. 3B
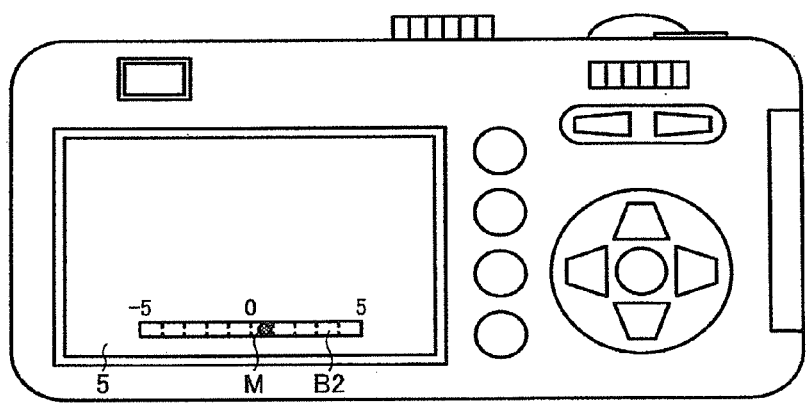

FIG. 4A
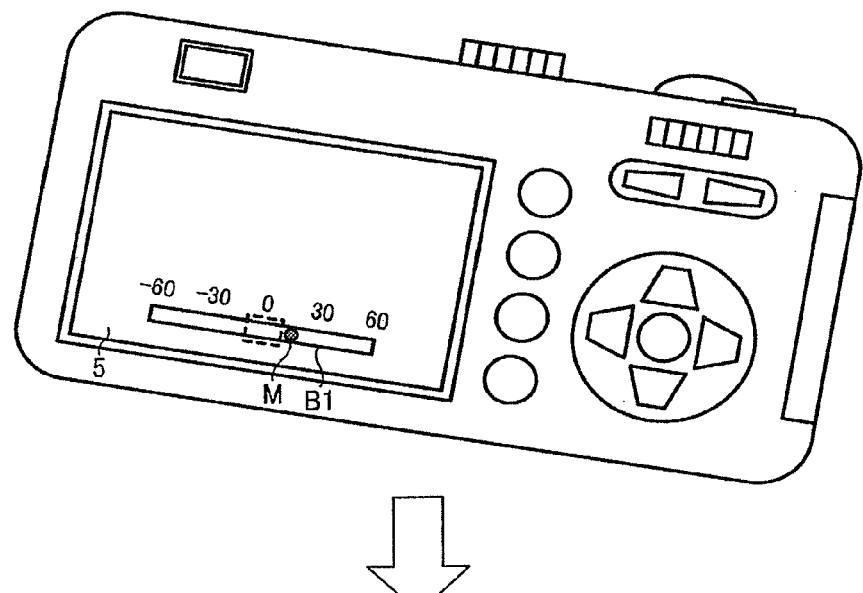
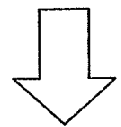
FIG. 4B
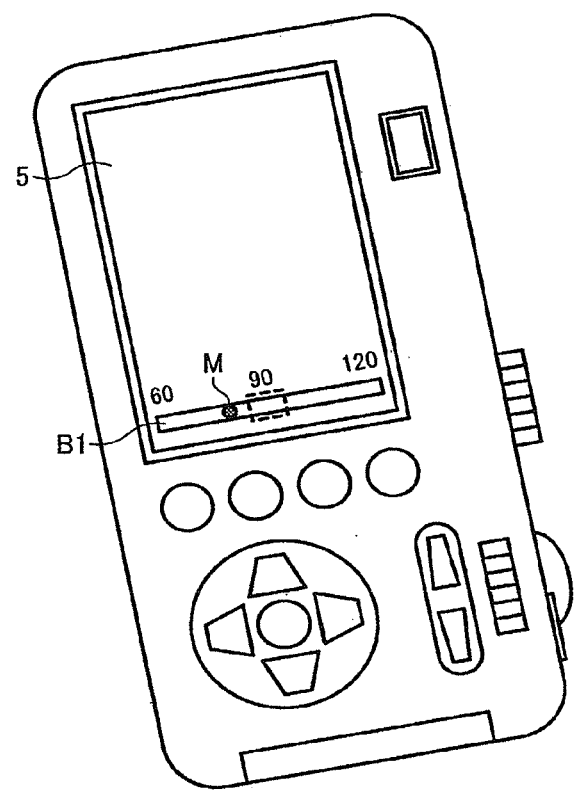

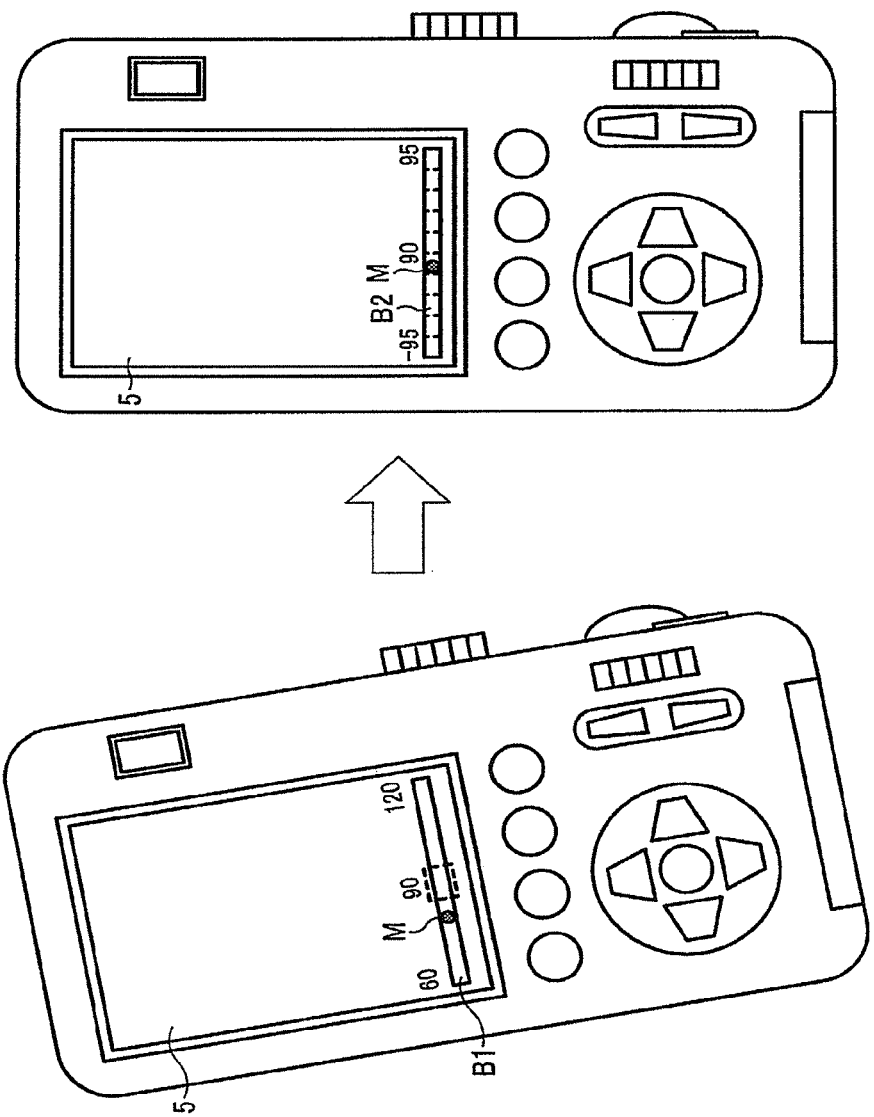

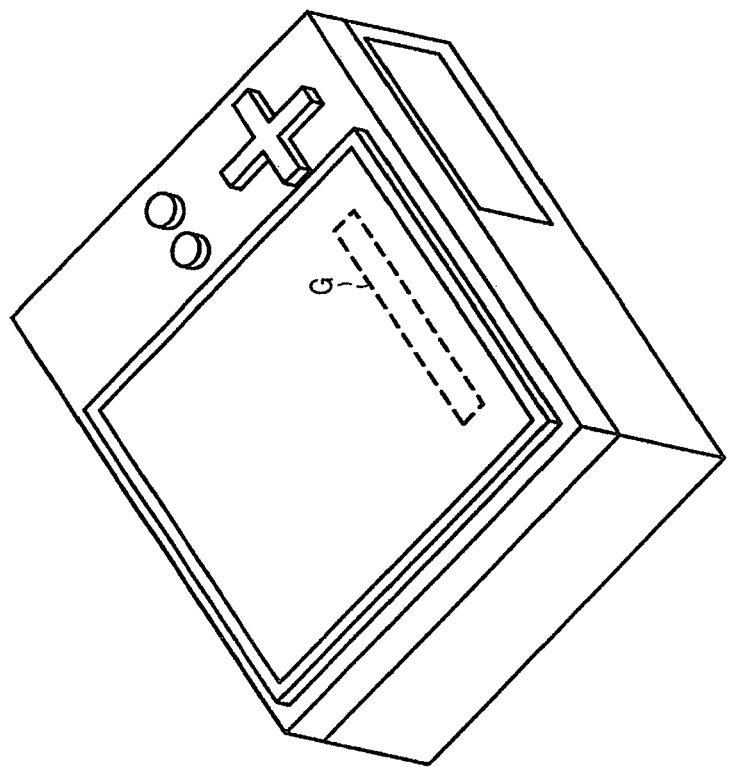
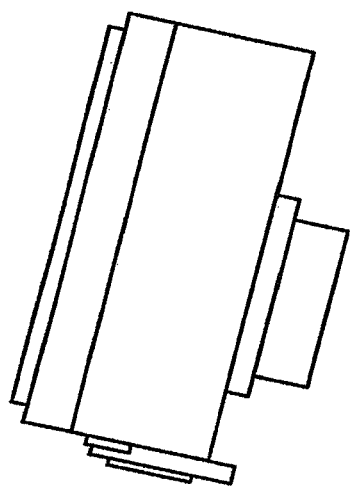
FIG. 17A
FIG. 17B

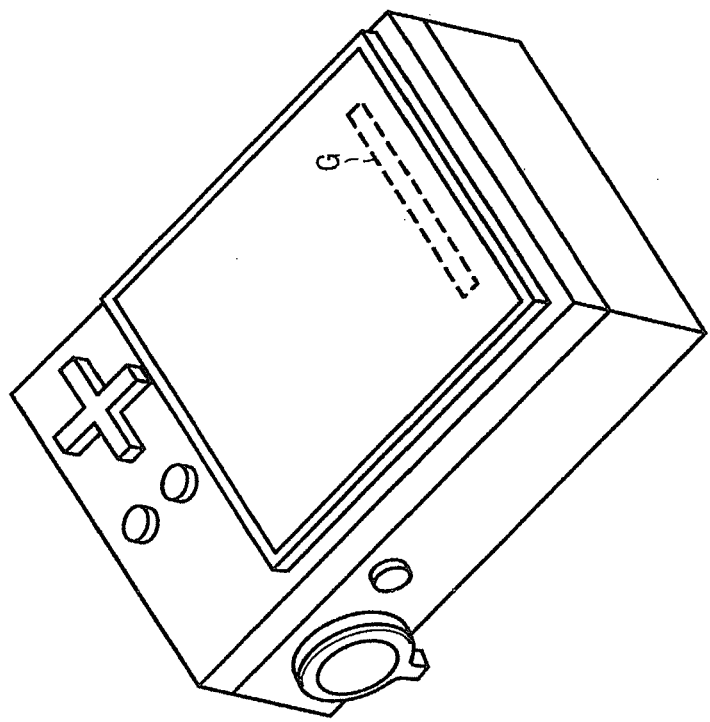
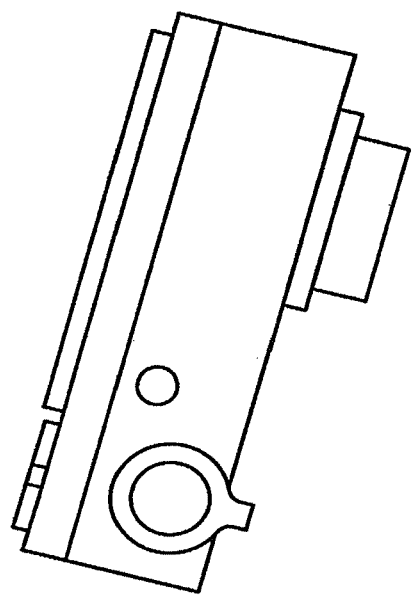

IMAGING APPARATUS CAPABLE OF DETECTING AND DISPLAYING INFORMATION WITH RESPECT TO AN INCLINE THEREOF

CROSS REFERENCE TO THE RELATED APPLICATIONS

The present application is a divisional of U.S. application Ser. No. 13/307,020, filed Nov. 30, 2011, which is a divisional of U.S. application Ser. No. 12/212,962, filed on Sep. 18, 2008, now U.S. Pat. No. 8,089,549, and is based on and claims priority from each of Japanese Patent Application No. 2007-243138, filed on Sep. 19, 2007 and Japanese Patent Application No. 2007-279727, filed on Oct. 27, 2007, the disclosures of which are hereby incorporated by reference herein in their entireties. The entire disclosures of U.S. application Ser. Nos. 13/307,020 and 12/212,962 are incorporated herein by reference.

BACKGROUND OF THE INVENTION

1. Field of the Invention

The present invention relates to an imaging apparatus, and relates in particular to an imaging apparatus that is capable of detecting an incline of the imaging apparatus, and of accurately displaying an incline guide image, which corresponds to an information of the incline thereof, upon a screen of an image display device.

2. Description of the Related Art

In recent times, an advance in a miniaturization and a weight reduction with respect to an imaging apparatus, such as a digital camera, has allowed the imaging apparatus to be carried more portably, and used more easily, in a variety of locales than was heretofore possible. A function of a digital camera has also been embedded into such a device as a cellular phone.

Given that the miniaturization and the weight reduction that is a condition of an imaging apparatus that incorporates such a digital camera, and given that a possession of the imaging apparatus thereof is maintained on a possessor's person, it is by no means guaranteed that a photograph will be taken with such a digital camera being in a stable direction. As a consequence of such a circumstance, an incline is likely to occur within an image that is even harder to notice when the image is photographed than under a more conventional circumstance thereof.

On the other hand, a circumstance may also arise wherein a photograph is taken by way of a deliberately inclined composition, as an actual photographic technique of an imaging apparatus. In addition, a circumstance may also arise with respect to an imaging direction, wherein a composition is not limited to a horizontal direction, i.e., a landscape view, and a vertical direction, i.e., a portrait view, may be employed as well.

In any such event, it is desirable for the imaging apparatus to comprise a function that makes a photographer aware of an incline of an image, such as by detecting an incline of the imaging apparatus when taking a photograph, and displaying an angle of the incline thereof upon a monitor screen.

Japanese Patent Application Laid Open No. 2004-343476 discloses an imaging apparatus that detects an incline of a still image when acquiring the still image, corrects the incline of the still image as necessary by way of a post-processing by recording an information that denotes the incline thereof thus detected together with the still image upon a recording medium, thereby accurately reflecting an intent of a user thereof, and facilitating a proper correction of an incline of a result of the imaging by the imaging apparatus.

In addition, Japanese Patent Application Laid Open No. 2007-174156 discloses an imaging apparatus wherein is installed a photography mode that supports either a moving picture or a still picture, and only when a display of an incline is requested when in the still picture photography mode, an incline guide display signal is generated from the incline information thus detected, the incline guide display signal thus generated is transmitted thereby to a display processing circuit, and an incline guide display is displayed upon a screen that displays an image thus imaged by the imaging apparatus.

Furthermore, Japanese Patent No. 3,896,505 discloses an imaging apparatus that detects a direction of a camera by way of a direction detection device that is installed into the camera, displays, upon a screen that displays an image thus imaged by the imaging apparatus, a horizontal baseline of the camera and an incline information that changes in a manner that is dependent upon a direction of the camera, simultaneously with the image thus imaged by the imaging apparatus, and facilitates a correction of an incline of the camera by allowing the photographer to compare the respective displays thereupon.

It is to be understood that a level, i.e., a container that contains a gas bubble within a fluid body, and which may be installed using a hot shoe of an imaging apparatus that incorporates a digital camera, is available for sale in an appropriate market.

With respect to such an imaging apparatus as described herein, however, i.e., with respect to the imaging apparatus that is disclosed according to Japanese Patent Application Laid Open No. 2004-343476, as an instance thereof, while a cylindrical display unit is employed with regard to a display screen thereof to display the incline thereof, an accuracy of the detection of the incline thereof is fixed, and thus, even if the accuracy of the detection of the incline thereof were to be increased, it would not be possible to display a corresponding information that would result therefrom.

In addition, with regard to the respective imaging apparatus that is disclosed according to Japanese Patent Application Laid Open No. 2007-174156 and Japanese Patent No. 3,896,505, a configuration is employed therein whereby the user is made aware of the direction of the imaging apparatus by making the user aware of an incline of a photographic image or a composite image, which, while useful in allowing the photographer to intuitively ascertain the direction of the imaging apparatus thereof, does not allow displaying a magnitude of the incline of the imaging apparatus with a high degree of accuracy.

SUMMARY OF THE INVENTION

It is an objective of the present invention to provide an imaging apparatus that is capable of implementing a user interface that improves a usability thereof by separating focusing on an accuracy thereof versus improving an ease of use thereof, according to a range wherein the accuracy is demanded and a range wherein the accuracy is not demanded, in accordance with an incline of the imaging apparatus.

It is another objective of the present invention to provide an imaging apparatus that is capable of allowing a user to ascertain with ease, intuitively as well as quantitatively, an incline guide display that corresponds to incline information of the imaging apparatus.

In order to achieve the above objects, an imaging apparatus according to an embodiment of the present invention includes an imaging element configured to convert an optical image to a digital image information, an imaging processing device configured to acquire an image information by way of the imaging element, an incline detection device configured to detect an incline of the imaging apparatus, an image display device configured to display an image based on the image information, an incline computation device configured to compute an incline information that corresponds to a magnitude of the incline, in accordance with a detection data that is obtained by the incline detection device, an information storage device configured to store the incline information that is computed by the incline computation device, and a display processing device configured to display the image and an incline guide display corresponding to the incline information upon a screen of the image display device. The display processing device is configured to change a display format of the incline guide display in accordance with the magnitude of the incline

BRIEF DESCRIPTION OF THE DRAWINGS

FIGS. 2A and 2B are a block diagram that conceptually depicts a system configuration of the imaging apparatus according to the present invention.

FIG. 3A and FIG. 3B are views showing a display state of a monitor display when an imaging apparatus according to a first embodiment of the present invention returns from a state wherein an incline is applied thereto to a state that is in a near vicinity of a zero degree incline.

FIG. 4A and FIG. 4B are views showing a display state of the monitor display when the imaging apparatus according to the first embodiment of the present invention is inclined from the state wherein the incline is applied thereto to a state that is in a near vicinity of a 90 degree incline.

FIG. 5A and FIG. 5B are views showing a change in a display state of the monitor display when the imaging apparatus according to the first embodiment of the present invention achieves the incline from an initial inclined state to the state that is in the near vicinity of the 90 degree incline.

FIG. 17A is an oblique external view of the digital camera whereupon the display format of the incline guide display of the monitor display in the landscape view circumstance is depicted by the imaging apparatus according to the eleventh embodiment of the present invention.

FIG. 17B is an oblique lateral external view of the digital camera that is depicted in FIG. 17A.

FIG. 20A is an oblique external view of the digital camera whereupon the display format of the incline guide display of the monitor display in the portrait view circumstance is depicted by the imaging apparatus according to the eleventh embodiment of the present invention.

FIG. 20B is an oblique external top view of the digital camera that is depicted in FIG. 20A.

DETAILED DESCRIPTION OF THE PREFERRED EMBODIMENTS

Following is a detailed description of preferred embodiments of an imaging apparatus according to the present invention, with reference to the attached drawings.

Figure 1A:
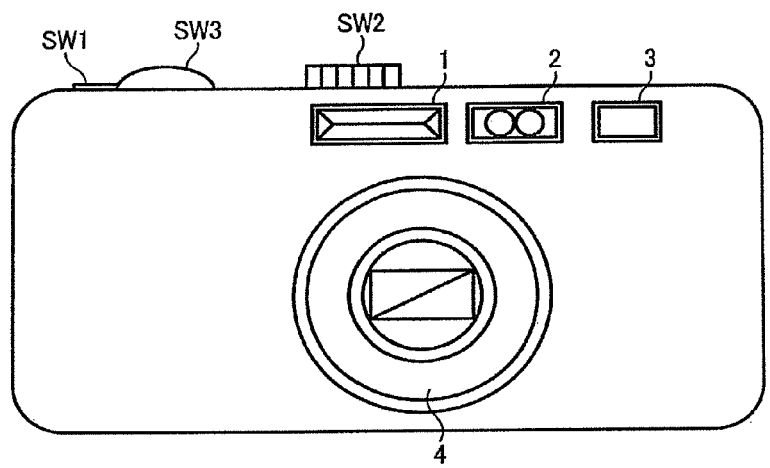
FIG. 1A is a front external view of a digital camera whereto is applied an imaging apparatus according to the present invention.
Figure 1B:
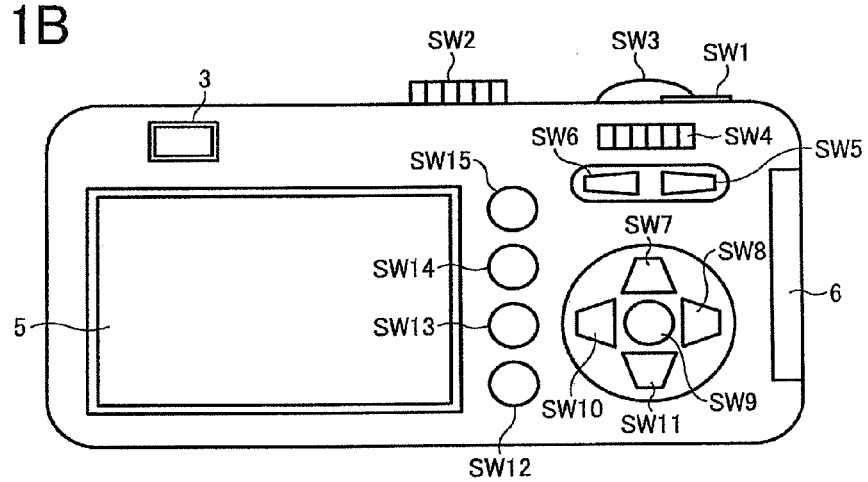
FIG. 1B is a rear external view of the digital camera that is depicted frontally in FIG. 1A.
Figure 1C:
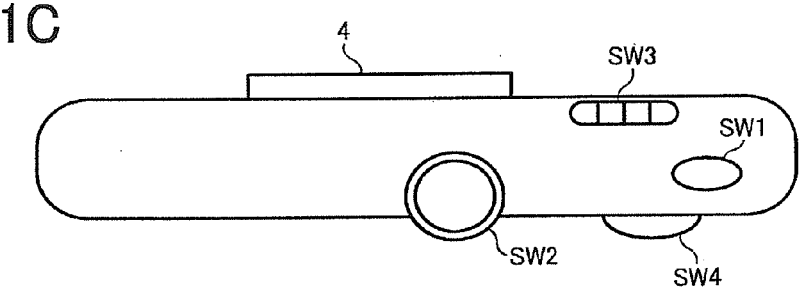
FIG. 1C is a plan external view of the digital camera that is depicted frontally in FIG. 1A.
Figure 2B:
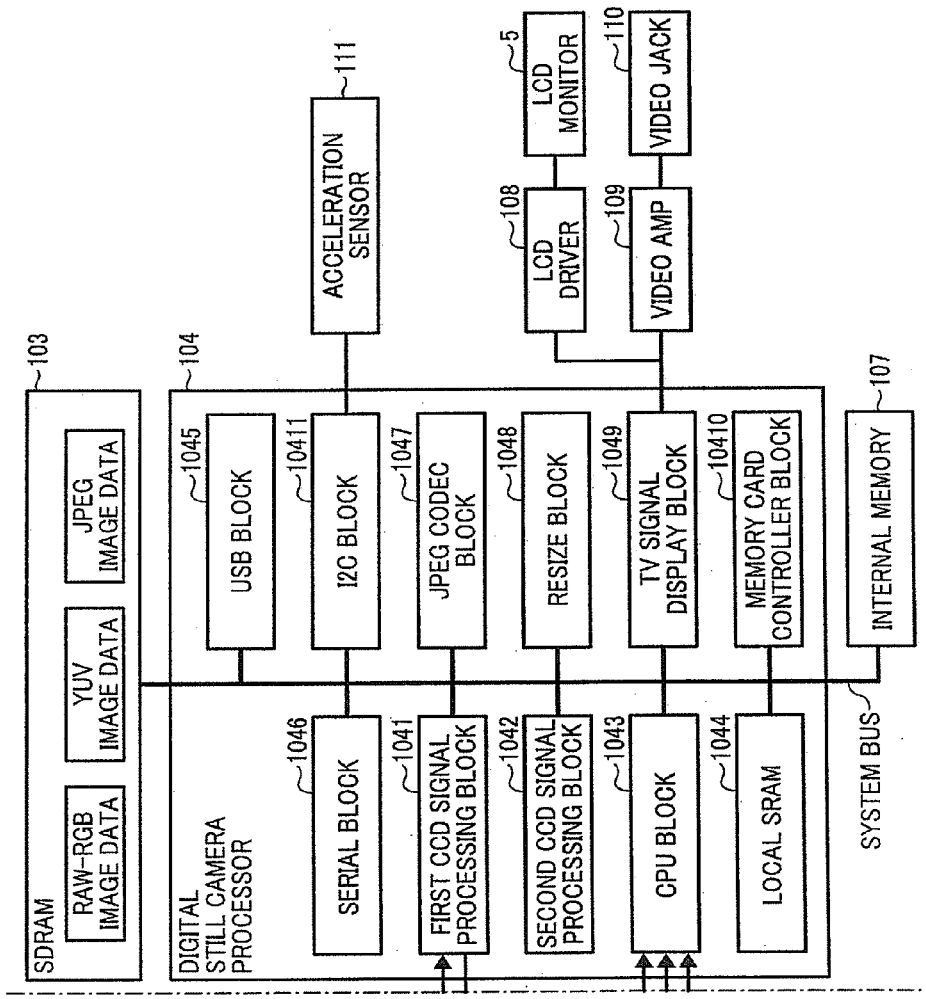

FIG. 1A to FIG. 1C depict an embodiment wherein an imaging apparatus according to the present invention is applied, as an instance thereof, to a digital camera, and FIGS. 2A and 2B conceptually depict a system configuration of an internal component of the imaging apparatus thereof.

As depicted in FIG. 1A to FIG. 1C, a release switch, i.e., a shutter release button, SW1, a mode dial switch SW2, and a first jog dial switch SW3 is located upon an upper surface of the digital camera. In addition, a strobe light emitting unit 1, a range finder unit 2, an optical viewfinder 3, and a lens barrel unit 4 is installed upon a front surface of the digital camera. The lens barrel unit 4 incorporates a photographic lens.

An LCD monitor 5, a second jog dial switch SW4, a zoom switch "telephoto" SW5, a zoom switch "wide" SW6, an "up" switch SW7, a "right" switch SW8, an "OK" switch SW9, a "left" switch S10, a "down/macro" switch SW11, a display switch SW12, a delete switch SW13, a menu switch SW14, and a power switch SW15, is installed upon a rear surface of the digital camera, as is depicted in FIG. 1B. In addition, a battery cover 6 is installed upon a lateral surface of the digital camera.

Each respective switch SW1 to SW15 is operated by a user, and configures a console key unit of the digital camera. It is to be understood that an external view of the digital camera as the imaging apparatus according to the present invention is not necessarily restricted to the external view thereof that is depicted in FIG. 1A to FIG. 1C, and it would be permissible for the digital camera as the imaging apparatus according to the present invention to present an external view that differs from the external view thereof that is depicted in FIG. 1A to FIG. 1C.

A function of each respective component of the digital camera as the imaging apparatus, and an effect thereof, is a known and established function and effect thereof. A detailed description thereof will thus be omitted herein, and a description of the system configuration of the internal component of the imaging apparatus thereof will be provided hereinafter, in accordance with FIGS. 2A and 2B, and with reference to FIG. 1A to FIG. 1C.

In FIGS. 2A and 2B, a fixed imaging element, i.e., a charge-coupled device (CCD), 101 is an imaging element that is configured to employ such as a charge-coupled device (CCD) or a complementary metal oxide semiconductor (CMOS), as an instance thereof, in order to optoelectrically convert an optical image. A front-end IC 102 as an imaging processing device is configured as an integrated circuit (IC), comprising a correlated double sampling (CDS) unit 1021, which performs a correlated double sampling in order to eliminate an image noise, an automatic gain control (AGC) unit 1022, which performs a gain adjustment, an analog-digital (A/D) conversion unit 1023, which performs an analog to digital conversion upon an image, and a timing signal generation unit (TG) 1024, which generates a drive timing signal. In the present circumstance, a vertical drive synchronization signal VD and a horizontal drive synchronization signal HD are supplied to the TG 1024 from a first CCD signal processing block 1041, and a drive timing signal is outputted from the TG 1024 to the CCD 101 and the front-end IC 102 in response to a signal that is outputted to the TG 1024 from a CPU block 1043.

A digital still camera processor 104 (hereinafter "processor 104") comprises the first CCD signal processing block 1041, which performs a white balance setting and a gamma setting upon an outputted image that is outputted thereto from the CCD 101 by way of the front-end IC 102, and which also supplies the vertical drive synchronization signal VD and the horizontal drive synchronization signal HD to the TG 1024 of the front-end IC 102, a second CCD signal processing block 1042, which performs, by way of a filtering process, a conversion of an image data to a brightness data and a color difference data, the central processing unit (CPU) block 1043, which controls an operation of each component of the apparatus, a local static random access memory (SRAM) 1044, which is for temporarily saving such as a data that is necessary for a control to be performed, a USB block 1045, which is for performing a USB communication between the imaging apparatus and an external device, such as a personal computer (PC), a serial block 1046, which is for performing a serial communication between the imaging apparatus and an external device, such as a PC, a JPEG codec block 1047, which performs a JPEG compression and decompression, a resize block 1048, which enlarges and reduces a size of the image data, by way of an interpolation process, a TV signal display block 1049, which converts the image data into a video signal, in order to be displayed upon an external display device, such as an LCD monitor or a television (TV) receiver, and a memory card controller block 10410, which performs a control of a memory card, which is for recording the image data that is photographed with the imaging apparatus. Each respective component is bidirectionally connected by way of a system bus.

In addition, a synchronous dynamic random access memory (SDRAM) 103, which saves a RAW RGB image data, i.e., an RGB image data that is in a state whereupon only the white balance adjustment and the gamma adjustment have been performed, a YUV image data, i.e., an image data that is in a state whereupon the brightness data conversion and the color difference data conversion have been performed, and a JPEG image data, i.e., an image data that is in a state of the JPEG compression having been applied thereto, is positioned external to the processor 104. The SDRAM 103 is connected to the processor 104 via a memory controller (not shown) and the system bus.

The SDRAM 103 temporarily saves the image data when each respective type of process is performed by the processor 104 upon the image data. The image data thus saved is, as an instance thereof, such as the RAW RGB data, which is in the state of having been loaded from the CCD 101 via the front-end IC 102, and whereupon the white balance adjustment and the gamma adjustment have been performed by the first CCD signal processing block 1041, the YUV data, which is in the state whereupon the brightness data conversion and the color difference data conversion have been performed by the second CCD signal processing block 1042, and the JPEG image data whereupon the JPEG compression has been applied by the JPEG codec 1047.

Furthermore, an internal memory 107, such as a RAM, i.e., an internal memory that is for storing a photographic image data even when the memory card is not loaded into a memory card slot of the imaging apparatus, and a ROM (not shown) wherein is stored such as a control program and a parameter, is installed external to the processor 104, and is also connected to the processor 104 by way of the system bus.

When the power switch SW15 of the digital camera is switched on, the control program that is stored in the ROM is loaded into a main memory (not shown) of the processor 104, whereupon the processor 104 performs an operation control of upon each respective component of the imaging apparatus according to the control program thus loaded thereto, and causes such as a control data and the parameter to be temporarily stored in such as the internal memory 107.

The lens barrel unit 4 comprises a lens barrel, which is formed from a zoom optical assembly 41, which further comprises a zoom lens 41a that takes in an optical image of a photographic subject, a focus optical assembly 42, which further comprises a focus lens 42a, an aperture stop unit 43, which further comprises an aperture stop 43a, and a mechanical shutter unit 44, which further comprises a mechanical shutter 44a. It is to be understood that the zoom lens 41a, the focus lens 42a, and the aperture stop 43a configure a photographic optical assembly. In addition, an optical axis of the photographic optical assembly is treated as a Z-axis, and a plane that is orthogonal to the Z-axis thereof is treated as an X-Y plane.

The zoom optical assembly 41, the focus optical assembly 42, the aperture unit 43, and the mechanical shutter unit 44 are driven by a zoom motor 41b, a focus motor 42b, an aperture stop motor 43b, and a mechanical shutter motor 44b, respectively.

Each respective motor 41b to 44b of the lens barrel unit 4 is driven by a motor driver 45, and the motor driver 45 is controlled by the CPU block 1043 of the processor 104.

In addition, an optical image of a photographic subject is formed upon a photosensitive surface of the CCD 101, which is the fixed imaging element of the imaging apparatus, and which optoelectrically converts an optical image that is obtained by way of each respective lens assembly of the lens barrel unit 4, whereupon the CCD 101 converts the optical image of the photographic subject that is formed thereupon into an electrical image information, and outputs an image signal to the front-end IC 102.

A signal control processing thereof is performed via the TG 1024 by way of the VD (vertical drive synchronization)-HD (horizontal drive synchronization) signal that is outputted from the first CCD signal processing block 1041 of the processor 104. The TG 1024 generates a drive timing signal in accordance with the VD-HD signal that is received thereby.

In order to perform the white balance adjustment and the gamma adjustment upon the outputted data that is obtained from the CCD 101 by way of the front-end IC 102, the processor 104 supplies the vertical drive synchronization signal VD and the horizontal drive synchronization signal HD by way of the first CCD signal processing block 1041, and performs the conversion upon the outputted data to the brightness data and the color difference data by way of the filtering process by way of the second CCD signal processing block 1042.

In addition, the CPU block 1043 controls the operation of each respective component of the apparatus, and temporarily stores such as the data that is necessary for the control thereof in the local SRAM 1044. In addition, the processor 104 computes a data that denotes an incline of the imaging apparatus, in accordance with an angle data that is transmitted from an acceleration sensor 111, and displays the incline information thus computed, by way of an LCD driver 108, upon the LCD monitor 5 (to be described in detail hereinafter).

The CPU block 1043 further causes the strobe light emitting unit 1 to emit a flash by controlling a strobe circuit 114. In addition, the CPU block 1043 also controls the range finder unit 2.

The CPU block 1043 is connected to a sub-CPU 112 of the processor 104, and the sub-CPU 112 is connected to the console key unit that is formed from the operating switch SW1 to SW15. The console key unit, i.e., the operating switch SW1 to SW15, is a console unit that is formed from a key switch group that the user operates. In addition, the sub-CPU 112 is a CPU that is built onto a single chip with a ROM and RAM, and as such, outputs an output signal of such as the console key unit, i.e., the operating switch SW1 to SW15, to the CPU block 1043, as operating information of the user.

The USB block 1045 performs the USB communication between the imaging apparatus and the external device, such as the personal computer (PC), by way of a USB connector (not shown). In addition, the serial block 1046 is connected to an external device from a serial driver circuit (not shown), by way of a serial communication connector, such as an RS-232C connector, and performs a serial communication thereby. The TV signal display block 1049 is connected to the LCD monitor 5 by way of the LCD driver 108, and is also connected to a video jack 110, which is a jack for connecting the camera to an external display device, such as a TV, by way of a video amp 109, which is an amp, i.e., an amplifier, for converting a video signal that is outputted from the TV signal display block 1049 to an impedance of 75 ohms. The memory card controller block 10410 is connected to a card connection site of the memory card slot (not shown). An Inter Integrated Circuit ($I^2C$) block 10411 is connected to the acceleration sensor 111, as an incline detection device.

The LCD driver 108 is a drive circuit, which both drives the LCD monitor 5 and converts the video signal that is outputted from the TV signal display block 1049 into the signal that is displayed upon the LCD monitor 5. The LCD monitor 5 is a display device that is used as a monitor, and as such, has a purpose of monitoring a state of a photographic subject prior to a photographing thereof, as well as verifying the photographic image that is taken thereof, and displaying an incline of the imaging apparatus (to be described hereinafter). The LCD monitor 5 is employed to display the image data and the incline information of the imaging apparatus that is recorded upon the memory card or the internal memory 107.

The video amp 109 is an amplifier that is for converting the video signal that is outputted from the TV signal display block 1049 to the 75 ohm impedance, and the video jack 110 is a connecting jack for connecting the imaging apparatus to an external display device such as a TV receiver.

The sub-CPU 112 is a CPU that is built onto a single chip with a ROM and RAM, and as such, outputs an output signal of such as the console key unit, i.e., the operating switch SW1 to SW15, to the CPU block 1043, as operating information of the user. The internal memory 107 is for storing the image data that is photographed by the imaging apparatus.

The acceleration sensor 111, as the incline detection device, is built into a printed circuit board (PCB) that configures each respective component of the imaging apparatus, and as such, detects the X-axis and the Y-axis data (X, Y) and a data of a temperature T, and transmits the data thus detected to the $I^2C$ block 10411 of the processor 104. The processor 104 uses, as an instance thereof, the CPU block 1043, to compute an incline information such as a roll angle that is to be displayed through an incline computation device, in accordance with the data that is passed to the processor 104 from the acceleration sensor 111 by way of the $I^2C$ block 10411, to select a display image that corresponds to a size of a display scale of the roll angle thus computed through a display processing device, to composite an image of a mark M that symbolizes a location upon the display image that denotes the roll angle thus computed, and to display the image that is obtained by the compositing described herein upon such as the LCD monitor 5, i.e., an image display device.

When treating an outputted data of a zero gravity instance of the X-axis data and the Y-axis data (X, Y) as X0 and Y0, respectively, a roll angle θ with respect to the horizontal of the acceleration sensor 111 is denoted by an equation (1), as follows:

$$\theta[\deg] = 180/\pi * \arctan\{(Y-Y0)/(X-X0)\} \qquad (1)$$

In a similar manner thereto, another acceleration sensor 111, which is installed so as to be capable of detecting an incline of the imaging apparatus in a pitching direction, detects a pitch angle to be displayed and transmits a data thereof to the processor 104. The processor 104 is capable of using, as an instance thereof, the CPU block 1043, to compute an incline of the imaging apparatus, i.e., a pitch angle, that is to be displayed, i.e. an incline computation device, in accordance with the data that is transmitted from the acceleration sensor 111, and of overlaying the pitch angle thus obtained upon the photographic image and displaying the image thus overlaid upon the LCD monitor 5. Note, however, that a function thereof that is described herein is optional, and thus, may be omitted. When installing the function thereof, however, it is desirable that a selection button also be installed, in order to allow the user to select an instruction that either only the roll angle, only the pitch angle, or both the roll angle and the pitch angle, be displayed.

When displaying the roll angle and/or the pitch angle upon the LCD monitor 5, the processor 104 determines a magnitude of the roll angle and/or the pitch angle thus computed, and changes a gauge of a display scale that displays the angle thereof in accordance with the magnitude of the angle thus determined. The display scale thereof appends a mark M, which is a simulated image of a bubble that is intended to represent a bubble in a level, in a manner similar to an actual liquid-filled level, and the user recognizes the angle by looking at a scale marker on the simulated scale thus displayed whereupon the mark M is located. As a consequence thereof, the processor 104 composites the image of the mark M that denotes the angle upon the display scale whereof the gauge has been selected, and displays the image thus composited upon the LCD monitor 5. In addition, it is presumed that the angle is recorded upon such as the internal memory 107.

When the roll angle that is derived by the equation (1), which does not directly denote the incline of the imaging apparatus, signifies that the imaging apparatus is in a state such as is depicted in FIG. 3A, or, put another way, when the imaging apparatus is in a range of between ±five degrees and ±60 degrees from the horizontal thereof, it is possible for the processor 104 to configure a display scale B1, which denotes the roll angle thereof, so as to be displayed in a state of a landscape direction, i.e., in a direction that corresponds to a lengthwise direction of the display screen of the imaging apparatus, upon the display screen of the LCD monitor 5. On the other hand, if the roll angle in a left-right direction with respect to the horizontal of the imaging apparatus is within a prescribed narrow range, such as zero degrees ±five degrees thereof, a gauge of a display scale B2 is automatically enlarged, such as is depicted in FIG. 3B, so as to facilitate a visual measurement of the roll angle with a high degree of accuracy. In addition, it is further possible to configure the screen display to switch to a vertical state, i.e., a portrait direction, when the roll angle of the imaging apparatus exceeds ±60 degrees from the horizontal, such as is depicted in FIG. 4B.

Furthermore, when the roll angle of the imaging apparatus enters a region of 90 degrees ±five degrees thereof, i.e., when the roll angle thereof approaches a vertical direction, the gauge of the display scale B2 is made to expand, thus improving the accuracy thereof. Typically, when the imaging apparatus is significantly inclined either to the left or the right from the horizontal, it is possible for the user to recognize that the imaging apparatus is inclined from the horizontal even with little or no visual observation of the display scale B1. Presuming, however, that the user will want to verify accurately whether or not the imaging apparatus is genuinely in a horizontal direction when the imaging apparatus is in a horizontal state that is considered to be a direction for photography, it is possible, with the imaging apparatus according to the embodiment, to enlarge the gauge of the display scale B2 when the roll angle is close to the horizontal, i.e., within ±five degrees thereof, and thus, to allow ascertaining the location of the mark M with a high degree of accuracy, thereby facilitating accurately fulfilling such a demand thereof on the part of the user as well.

It is to be understood that approaching the vertical as described herein need not necessarily be restricted to within ±five degrees of the horizontal, and it would be permissible for the range thereof to be within ±four to seven degrees of the horizontal, as an instance thereof.

Figure 6:
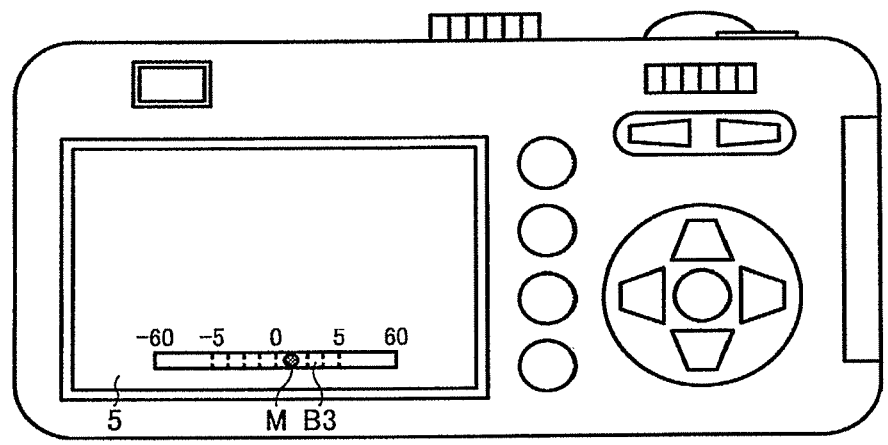
FIG. 6 is an external rear view of a digital camera whereupon a display format of an incline guide display of a monitor display is depicted by an imaging apparatus according to a second embodiment of the present invention.

In addition, as depicted in FIG. 6, it is possible for the processor 104 to configure the image display device such that only a single display scale is displayed at all times, as well as to display a component of the display scale at a finely divided gauge when the roll angle is near to the horizontal, i.e., a central component when the mark M is near a center of the display scale, without displaying a scale marking of the display scale B3 at an equal interval thereof, or put another way, not in a linear manner. It is also possible, when the roll angle is not close to the horizontal, such as when the roll angle is between ±five degrees of zero degrees, and ±five degrees of 60 degrees from the horizontal, for the processor 104 to configure the image display device such that a nonlinear display is performed thereof, wherein the component of the display scale wherein the mark M is located is displayed with a coarsely divided gauge.

It is thus possible to display the roll angle using only a single display scale, avoiding a necessity for having to perform a switch of the display scale B3, and, moreover, to display the roll angle thereof with a high angle of accuracy at such time when the accuracy thereof is required. As an instance thereof, it is possible to arbitrarily change the gauge of the display scale in a nonlinear manner, such as by displaying a logarithm, or an exponent, of the roll angle when the roll angle is within ±one degree from the horizontal.

In addition, the display processing device is configured to display the image and the incline guide display upon a screen of the image display device, and it is possible for the display processing device that is incorporated within a portion of the processor 104 to be configured with respect to the method of displaying the roll angle so as to change a sampling quantity or an average process quantity of the acceleration sensor 111 when the roll angle is in the state of being close to the horizontal, i.e., zero degrees ±five degrees, as well as when the roll angle is in the state of not being close to the horizontal, i.e., between ±five degrees of the horizontal and ±60 degrees of the horizontal. Put another way, when the roll angle is in a regular state that is not close to the horizontal, a sampling quantity and an average processing quantity of the roll angle with regard to the acceleration sensor 111 is controlled so as to allow instantaneously displaying an approximate incline of the imaging apparatus, thereby allowing the display processing device to respond even in a circumstance wherein the incline of the imaging apparatus changes suddenly and dramatically. On the other hand, when the roll angle is close to the horizontal, i.e., ±five degrees of the horizontal, the sampling quantity and the average processing quantity of the roll angle with regard to the acceleration sensor 111 is controlled so as to increase, and it is thus possible to configure the display processing device so as display a value of the incline thereof with a high degree of accuracy. In addition, it is possible to configure the display processing device when in the regular state and when in the horizontal state so as to change a speed at which the mark M moves along the display scale thereof. Put another way, it is possible to assign a priority thereof to a rapid response on the part of the display processing device by increasing a response speed thereof when in the regular state, and to assign the priority thereof to simplifying a process on the part of the user of aligning the imaging apparatus with the horizontal by retarding the response speed thereof when in the horizontal state.

Figure 8:
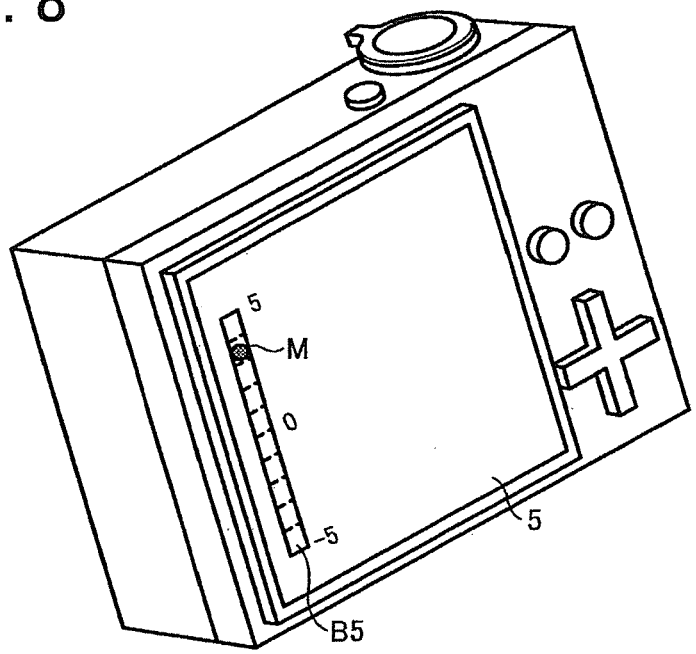
FIG. 8 is an oblique external view of a digital camera whereupon a display format of a pitch angle of an incline guide display of a monitor display is depicted by an imaging apparatus according to a fourth embodiment of the present invention.

In addition, when the pitch angle, i.e., an angle of an incline in an anteroposterior direction, is within a range of between ±five degrees and ±60 degrees of the horizontal, it is possible for the processor 104 to configure the imaging processing device so as to display a display scale B4 of the pitch angle, as depicted in FIG. 8, which includes a wide scale thereof, in a vertical direction upon the display screen of the LCD monitor 5.

Figure 7:
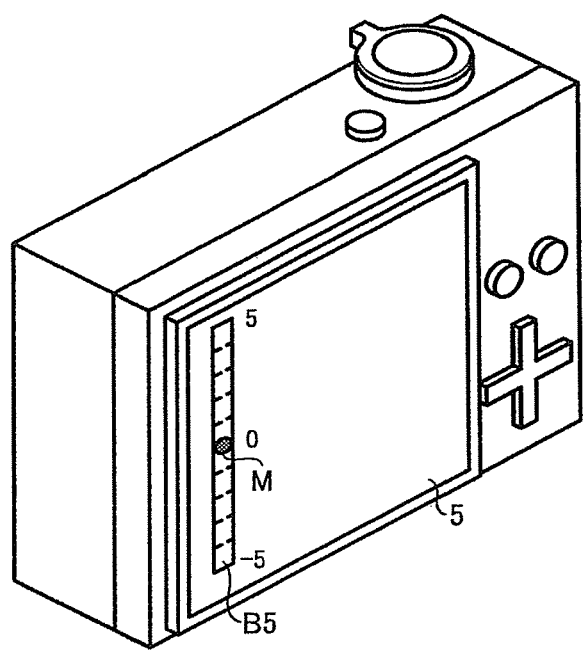
FIG. 7 is an oblique external view of a digital camera whereupon a display format of a pitch angle of an incline guide display of a monitor display is depicted by an imaging apparatus according to a third embodiment of the present invention.

In addition, it is possible to configure the imaging processing device such that, as the pitch angle approaches zero degrees, i.e., zero degrees ±five degrees, and as the pitch angle approaches the vertical, i.e., 90 degrees ±five degrees, it is possible to read the gauge of the display scale B4 so as to allow visually measuring the incline of the imaging apparatus with a high degree of accuracy, or put another way, to allow automatically enlarging the gauge and thereby performing a reading of the incline with a high degree of accuracy, such as per a display scale B5 that is displayed in FIG. 7.

In addition, with respect to the method of displaying the pitch angle, when the pitch angle is in a state of approaching the vertical, i.e., is 90 degrees ±five degrees, and when the pitch angle is in a regular state that is not close to the vertical, i.e., is between zero degrees ±five degrees and zero degrees ±30 degrees, it is possible for the processor 104, i.e., the display processing device, to be configured so as to change the sampling quantity or the average processing quantity of the acceleration sensor 111 thereupon. Put another way, when the pitch angle is in the regular state that is not close to the vertical, i.e., is between zero degrees ±five degrees and zero degrees ±30 degrees, the sampling quantity and the average processing quantity of the pitch angle with regard to the acceleration sensor 111 is controlled so as to allow instantaneously displaying an approximate incline of the imaging apparatus, thereby allowing the display processing device to respond even in a circumstance wherein the incline of the imaging apparatus changes suddenly and dramatically.

On the other hand, when the pitch angle is close to the vertical, i.e., 90 degrees ±five degrees, the sampling quantity and the average processing quantity of the pitch angle by the acceleration sensor 111 is controlled so as to increase, and it is thus possible to configure the processor 104 so as display a value of the incline thereof with a high degree of accuracy. In addition, it is possible to configure the display processing device, when in the regular state, i.e., a state wherein the pitch angle deviates from being close to the horizontal, and when in the state of being close to the horizontal, so as to change a speed at which the mark M moves along the display scale thereof. Put another way, it is possible to assign a priority to a rapid response on the part of the display processing device by increasing a response speed thereof when in the regular state, and to assign the priority to simplifying a process on the part of the user of bringing the imaging apparatus into an alignment with the horizontal by retarding the response speed thereof when in the horizontal state.

Following is a description of a process of the processor 104 that accomplishes the function of the display processing device when displaying a combined display of both the roll angle and the pitch angle.

Figure 10:
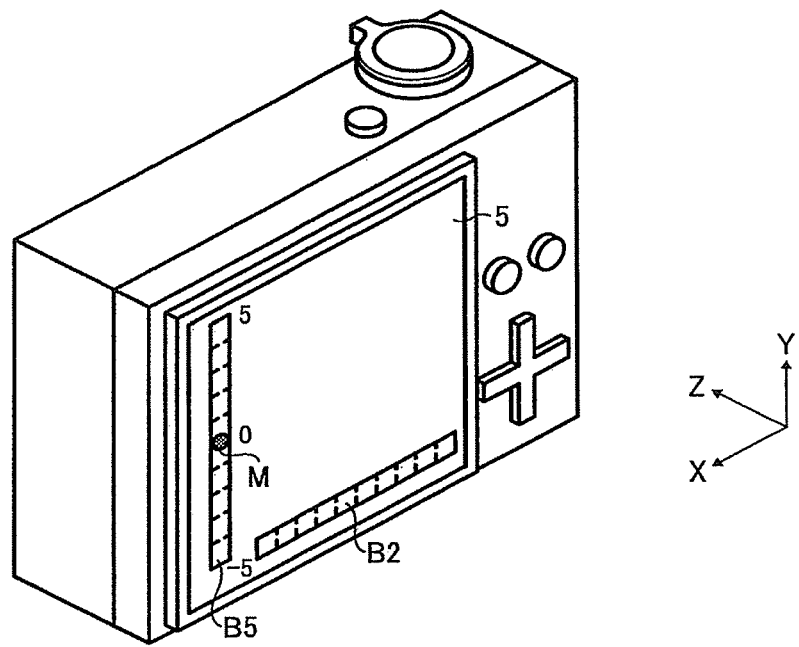
FIG. 10 is an oblique external view of a digital camera whereupon an incline guide display of both a roll angle and a pitch angle of a monitor display is depicted by an imaging apparatus according to an eighth embodiment of the present invention.

When the roll angle is within zero degrees ±60 degrees, it is possible for the processor 104 to configure the display processing device so as to display the roll angle thereof with both the display scale B1 and the mark M in the landscape direction upon the display screen of the LCD monitor 5, and to display the pitch angle with both the display scale B5 and the mark M, such as is depicted in FIG. 10. In addition, when the roll angle exceeds zero degrees ±60 degrees (not shown), it is possible for the processor 104 to configure the display processing device so as to switch the display of the roll angle from the horizontal direction display scale to the vertical direction display scale, and to switch the display of the pitch angle from the vertical direction display scale to the horizontal direction display scale.

In addition, it is possible to configure the processor 104 such that a coloration of a display scale that displays a wide display gauge differs from a coloration of a display scale that displays a narrow display gauge. As an instance thereof, a configuration is presumed that changes the coloration of the display scale when the incline of the imaging apparatus grows significantly, i.e., when the roll angle and/or the pitch angle changes from the state of zero degrees ±five degrees to the state of zero degrees ±60 degrees. In addition, a configuration is presumed that also changes the coloration of the display scale when the incline of the imaging apparatus grows significantly, i.e., when the roll angle and/or the pitch angle changes from the state of 90 degrees ±five degrees to the state of 90 degrees ±30 degrees. It is to be understood that it would be conceivable to perform a switch from a display scale in black to a display scale in red, as an instance of a change state of the coloration thereof.

Furthermore, it would be possible for the console surface of the imaging apparatus to be presumed to have a configuration that includes a selection button (not shown) that allows the user to select an instruction to display only the roll angle, only the pitch angle, or both the roll angle and the pitch angle, as the incline guide display thereof.

FIG. 3 to FIG. 10 depict a display method that displays an incline with regard to the imaging apparatus according to the present invention.

Following is a description of a concrete display method that displays the incline with regard to the imaging apparatus according to a first embodiment through an eighth embodiment, with reference to FIG. 3 to FIG. 9.

It is to be understood that a process according to each respective embodiment that is depicted hereinafter is primarily performed by such as the acceleration sensor 111, the processor 104, and the LCD monitor 5.

First Embodiment

According to a first embodiment, a configuration thereof is such that, when a roll angle that is derived by the equation (1) described herein is in a range of between zero degrees ±five degrees and zero degrees ±60 degrees, which is broadly considered to correspond to a landscape direction of a screen of the imaging apparatus when a lengthwise direction of the screen thereof is in a substantially horizontal direction, then a display scale B1 that denotes the roll angle thereof is displayed in a location that is near to a lower end of a display screen of the LCD monitor 5 in a landscape direction with respect to the display screen thereof, i.e., in a lengthwise direction of the imaging apparatus, such as is depicted in FIG. 3A. A gauge of the display scale B1 is automatically enlarged so as to allow a visual measurement of the roll angle with a high degree of accuracy when the roll angle approaches a horizontal region, i.e., when the roll angle is within zero degrees ±five degrees, or put another way, when the roll angle reaches a near horizontal region. An interval of a gauge of a display scale B2 that is depicted in FIG. 3B is larger than an interval of the gauge of the display scale B1 that is depicted in FIG. 3A, and thus, the gauge of the display scale B2 has a higher degree of accuracy than the gauge of the display scale B1. In addition, when the roll angle exceeds ±60 degrees, which is broadly considered to correspond to a portrait direction of the screen of the imaging apparatus when the lengthwise direction of the screen thereof is in a substantially vertical direction, the display is automatically switched to a portrait direction state, such as the scale B1 as is depicted in FIG. 4B. Furthermore, when the roll angle is in a range of between 90 degrees ±five degrees and 90 degrees ±30 degrees, a display scale B1 is displayed with a reduced gauge, such as is depicted in FIG. 5A, and in addition, when the roll angle is 90 degrees ±five degrees, i.e., when the roll angle is close to the vertical, a display scale B2 is displayed with the gauge therein enlarged so as to enable the display scale B2 to show the roll angle thereof with a high degree of accuracy, such as is depicted in FIG. 5B.

Second Embodiment

According to a second embodiment, only a single display scale B3 is displayed as the display scale, such as is depicted in FIG. 6, and is configured so as not to display a gauge of the display scale B3 thus displayed in an equal linear spacing, and to display the scale range thereof with a finely divided gauge when the roll angle is in the region that is close to the horizontal, and to display the scale thereof with a coarsely divided gauge when the roll angle is in the region that is not close to the horizontal, i.e., when the roll angle is zero degrees ±30 degrees. Such a configuration thereof allows displaying the roll angle in a rational manner without switching the display scale. As an instance of a display method thereof, it would be possible to arbitrarily change the gauge of the display scale B3, by way of a method such as displaying a logarithm, or an exponent, of the roll angle when the roll angle is within ±one degree from the horizontal.

Third Embodiment

According to a third embodiment, while a method of displaying either the roll angle or a pitch angle is identical to the display method thereof according to the first embodiment and the second embodiment, the processor 104 is configured so as to change a sampling quantity or an average process quantity of the acceleration sensor 111 when either the roll angle or the pitch angle is in the state of being close to the horizontal, i.e., zero degrees ±five degrees, as well as when either the roll angle or the pitch angle is in the state of not being close to the horizontal, i.e., between ±five degrees of the horizontal and ±60 degrees of the horizontal. Put another way, when either the roll angle or the pitch angle is in a regular state that is not horizontal, the processor 104 is configured so as to reduce a sampling quantity and an average processing quantity of either the roll angle or the pitch angle with regard to the acceleration sensor 111, in order to allow instantaneously displaying an approximate incline of the imaging apparatus, whereas on the other hand, when either the roll angle or the pitch angle is in the horizontal state, the processor 104 is configured so as to increase the sampling quantity and the average processing quantity of either the roll angle or the pitch angle with regard to the acceleration sensor 111, in order to allow displaying a value of the incline thereof with a high degree of accuracy. In addition, according to the embodiment, a configuration is possible when in the regular state and when in the horizontal state so as to change a speed at which a mark M moves along the display scale thereof, i.e., the display scale B1 and B2. In the regular state thereof, a response speed of the processor 104 increases, facilitating a rapid response thereby, whereas, in the horizontal state thereof, the response speed thereof decreases, allowing a user to align the imaging apparatus with the horizontal more easily.

Fourth Embodiment

Figure 9:
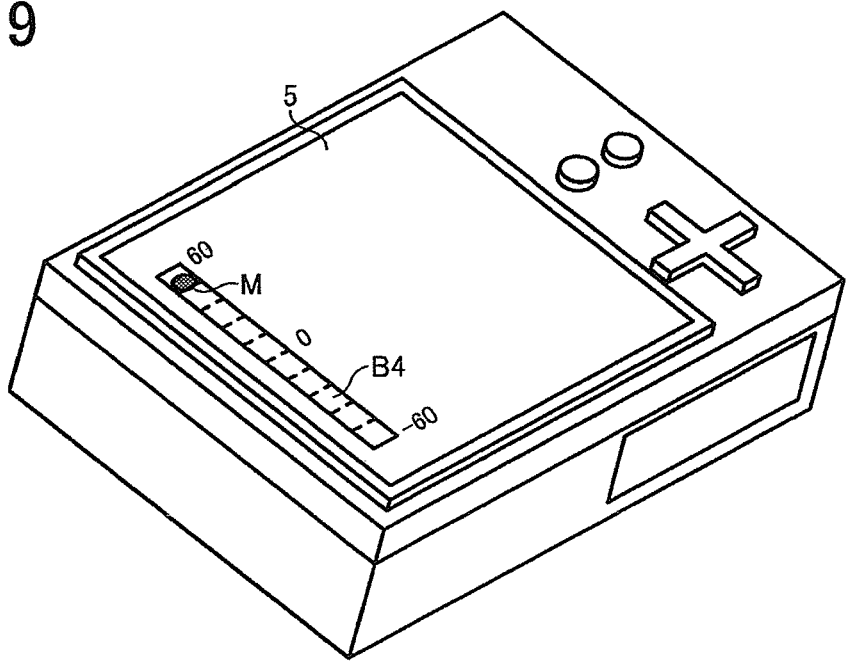
FIG. 9 is an oblique external view of the digital camera whereupon the display format of the incline guide display of the monitor display is depicted by the imaging apparatus according to the fourth embodiment of the present invention, in a circumstance wherein the digital camera thereof is angled until a large pitch angle is achieved.

According to a fourth embodiment, when the pitch angle is in a range of between zero degrees ±five degrees and zero degrees ±60 degrees, a display scale B4, with a wide gauge, i.e., a coarse gauge, of the pitch angle is displayed in a vertical direction upon the display screen of the LCD monitor 5, such as is depicted in FIG. 9.

In addition, as the pitch angle approaches the horizontal, i.e., zero degrees ±five degrees, a display of a gauge of the display scale B4 automatically enlarges in order to allow a visual measurement of the incline of the imaging apparatus with a high degree of accuracy, such as per a display scale B5 that is depicted in FIG. 7 and FIG. 8.

Fifth Embodiment

According to a fifth embodiment, while a method of displaying the pitch angle is identical to the display method thereof according to the fourth embodiment, the display method thereof according to the fifth embodiment differs from the display method thereof according to the fourth embodiment in that the processor 104 is configured so as to change the sampling quantity or the average processing quantity of the acceleration sensor 111 when the pitch angle is in a state that is close to the vertical, i.e., 90 degrees ±five degrees, as well as when the pitch angle is in a state that is not vertical, i.e., between 90 degrees ±five degrees and 90 degrees ±60 degrees. Put another way, when in the regular state, the processor 104 is configured so as to reduce the sampling quantity and the average processing quantity of the pitch angle with regard to the acceleration sensor 111, in order to allow instantaneously displaying the approximate incline of the imaging apparatus, whereas on the other hand, when the pitch angle approaches the horizontal state, the processor 104 is configured so as to increase the sampling quantity and the average processing quantity of the pitch angle with regard to the acceleration sensor 111, in order to allow displaying the value of the incline thereof with a high degree of accuracy. In addition, according to the embodiment, the processor 104 is configured so as to change the speed at which the mark M moves along the display scale thereof, i.e., the display scale B1 and B2, when in the regular state and when in the horizontal state. By configuring the processor 104 thereby, the response speed of the processor 104 increases when in the regular state thereof, facilitating the rapid response thereby, whereas the response speed thereof decreases in the horizontal state thereof, allowing the user to align the imaging apparatus with the horizontal more easily.

Sixth Embodiment

Following is a description of a sixth embodiment that combines the roll angle and the pitch angle, with reference to FIG. 10.

According to the sixth embodiment, when the roll angle is within zero degrees ±five degrees, the roll angle thereof is displayed with the display scale B2 in the horizontal state of the display screen of the LCD monitor 5, and the pitch angle thereof is displayed with the display scale B5 in the vertical state of the display screen of the LCD monitor B5, such as is displayed in FIG. 10. In addition, when the roll angle of the imaging apparatus exceeds ±60 degrees from the horizontal (not shown), the display of the roll angle switches to the display scale in the vertical state, and the display of the pitch angle switches to the display scale in the horizontal state.

Seventh Embodiment

According to a seventh embodiment, it is presumed that a different coloration is applied respectively to a display scale that displays a wide gauge of a display scale, and to a display scale that displays a narrow gauge of a display scale. As an instance thereof, the coloration of the display scale changes from black to red as the incline increases when the roll angle and/or the pitch angle changes from the state of zero degrees ±five degrees to the state of zero degrees ±60 degrees. In addition, the coloration of the display scale also changes when the incline grows significantly, i.e., when the roll angle and/or the pitch angle changes from the state of 90 degrees ±five degrees to the state of 90 degrees ±30 degrees, from black to red, as an instance thereof. It is to be understood that the coloration of the display scale is not limited to black and red, and a combination such as blue, green, or yellow would be permissible as well.

Eighth Embodiment

According to an eighth embodiment, a console surface of the imaging apparatus includes a selection button (not shown) that allows the user to select an instruction to display only the roll angle, only the pitch angle, or both the roll angle and the pitch angle.

By operating the selection button as appropriate to a photographic subject, the user will be able to perform a photography in an accurate manner, thus improving a convenience of the imaging apparatus to the user.

Ninth Embodiment

Following is a description of a ninth embodiment of the present invention, which is predicated upon employing an acceleration sensor comprising three axes that are mutually orthogonal thereto as the acceleration sensor 111 with respect to the imaging apparatus described herein to display both the roll angle and the pitch angle of the imaging apparatus.

Employing the acceleration sensor 111 thus comprising an output of the three axes that are mutually orthogonal thereto in order to ascertain a direction wherein the acceleration sensor 111 is embedded into the imaging apparatus comprises analyzing an acceleration of gravity along a direction of each respective axis in order to derive a magnitude of the acceleration with respect to each respective axis, and it is possible to accurately ascertain the incline of the imaging apparatus regardless of the direction as a consequence thereof.

In such a circumstance, when the imaging apparatus is positioned in the landscape direction, such as is depicted in FIG. 10, a rotation about a Z-axis therein constitutes a roll direction, a rotation about an X-axis therein constitutes a pitch direction, and a rotation about a Y-axis therein constitutes a yaw direction. When a lengthwise dimension of the imaging apparatus is positioned close to the horizontal, the acceleration that the Y-axis detects is approximately equivalent to the acceleration of gravity, and a value thereof that the X-axis and the Z-axis detect approaches zero. It is thus possible to ascertain an overall facing of the imaging apparatus by detecting which axis is primarily detecting the acceleration of gravity.

An incline data that the acceleration sensor 111 detects is received by a CPU 1043 via an $I^2C$ block 10411, the primary detection axis of the acceleration of gravity and the magnitude of the incline is computed, either in hardware or in software, and a result thereof is displayed upon the display device of the imaging apparatus.

Figure 11:
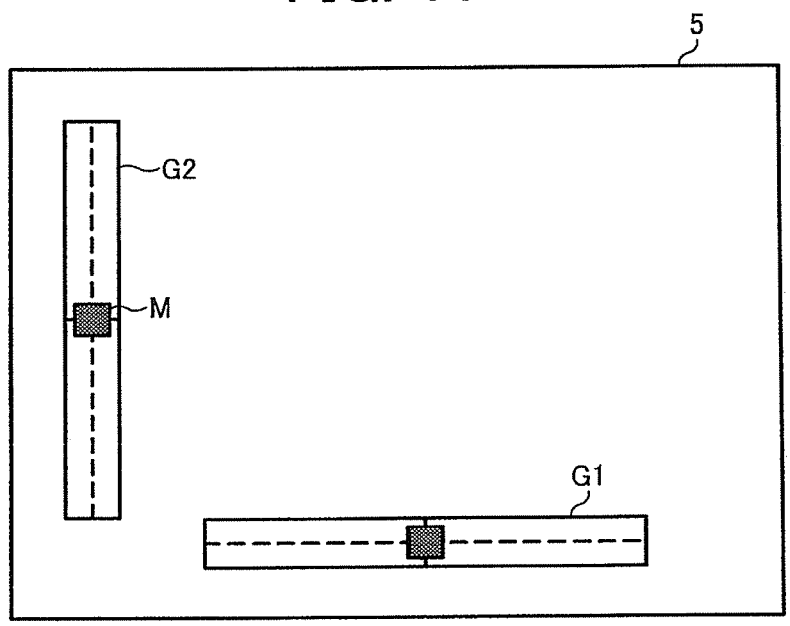
FIG. 11 is an instance of an incline guide display of both a roll angle and a pitch angle of a monitor display with respect to an imaging apparatus according to a ninth embodiment of the present invention.

In such a circumstance, the roll angle and the pitch angle, which signify the incline in the roll direction and the pitch direction, respectively, is displayed upon the LCD monitor 5 of the imaging apparatus, such as is depicted in FIG. 11.

In the circumstance depicted in FIG. 11, a display state of an incline guide G1 that denotes the roll angle is approximately identical to a display state of an incline guide G2 that denotes the pitch angle, a gauge of the incline guide G2 that follows the lengthwise direction of the display screen denotes the incline of the roll direction, and a gauge of the incline guide G2 that follows a non-lengthwise direction of the display screen denotes the incline of the pitch direction. When the imaging apparatus is inclined when a location of a square mark with respect to each respective gauge thereof is near a center of the gauge thereof, such as is depicted in FIG. 11, i.e., when both the roll angle and the pitch angle is zero, a movement away from the center of the gauge thereof by the square mark thereupon signifies a degree of the incline thereof, i.e., that the roll angle and the pitch angle is increasing in magnitude.

Figure 12:
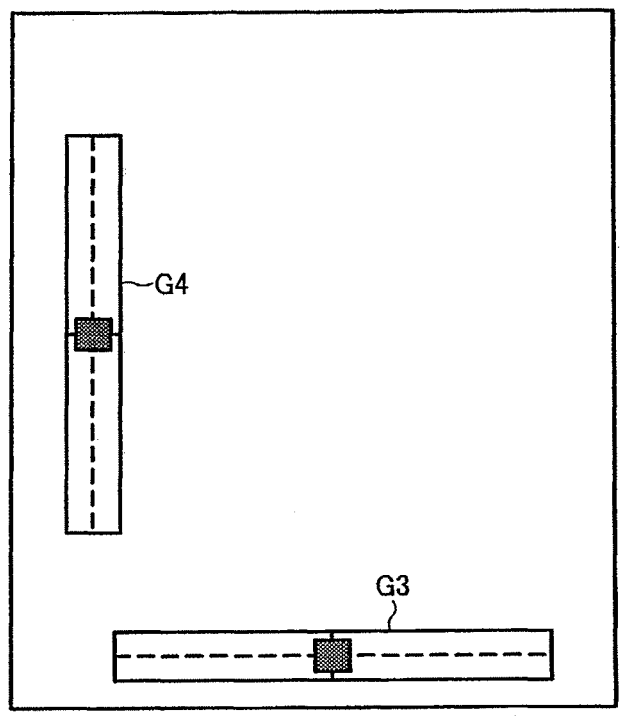
FIG. 12 is a view showing another instance of the incline guide display of both the roll angle and the pitch angle of the monitor display with respect to the imaging apparatus according to the ninth embodiment of the present invention.

FIG. 12 describes a display instance when the imaging apparatus is positioned in the portrait direction. According to the embodiment, while the display format of the incline guide display of the roll direction and the pitch direction that is depicted in FIG. 12 may appear to be nearly identical to the circumstance that is depicted in FIG. 11, the circumstance depicted in FIG. 12 differs from the circumstance depicted in FIG. 11 in that an incline guide display G3 that comprises the gauge of the non-lengthwise direction of the display device denotes the roll angle that is the incline of the roll direction, and an incline guide display G4 that comprises the gauge of the lengthwise direction of the display device denotes the pitch angle that is the incline of the pitch direction.

Figure 13:
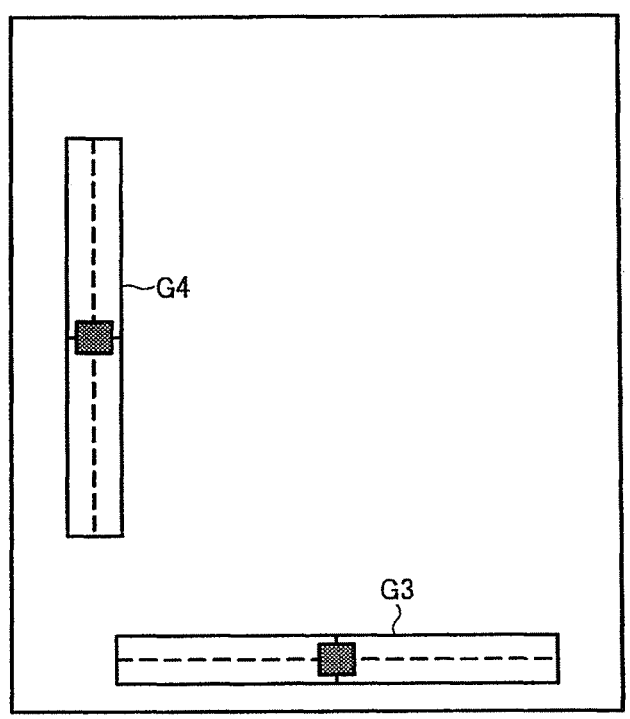
FIG. 13 is a view showing a display state of the incline guide display of both the roll angle and the pitch angle of the monitor display with respect to the imaging apparatus according to the ninth embodiment of the present invention.

It becomes increasingly difficult, however, to differentiate between the roll direction and the pitch direction when the incline display of the roll direction and the pitch direction are interchanged as a consequence of changing the direction of the imaging apparatus as described herein. In order to respond to such a circumstance, the incline guide display of the roll direction is given a display color that is different from a display color of the incline guide display of the pitch direction, such as is depicted in FIG. 13, with a display color of a marker of an incline guide display Gr1 of the roll direction being red, as an instance thereof, and a display color of a marker of an incline guide display Gp1 of the pitch direction being blue, as an instance thereof. In such a circumstance, as an instance thereof, the red marker represents the incline guide display Gr1 of the roll direction, and the blue marker represents the incline guide display Gp1 of the pitch direction, even if the facing of the imaging apparatus changes from the landscape direction that is depicted in FIG. 13 to the portrait direction. By thus assigning a different display color to the markers thereof, it is possible to intuitively comprehend a relation between each respective incline guide gauge and the roll angle and the pitch angle, even when the horizontal direction and the vertical direction is inverted as described herein.

Tenth Embodiment

Figure 14:
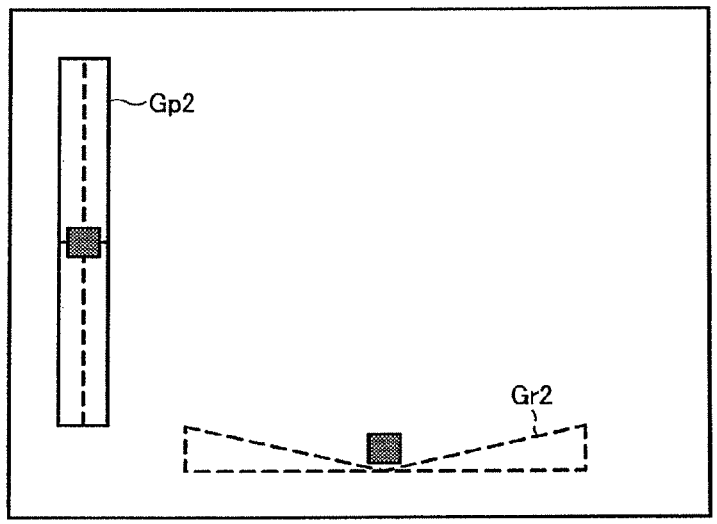
FIG. 14 is a view showing a display state of an incline guide display of both a roll angle and a pitch angle of a monitor display with respect to an imaging apparatus according to a tenth embodiment of the present invention.

According to a tenth embodiment, the display format of the incline guide display of the roll direction and the pitch direction is made to differ for a similar objective as the method according to the ninth embodiment, wherein a gauge of an incline guide display of the roll direction Gr2 assumes a form wherein a maximum height at a center narrows to a low, and the height thereof widens to a higher point approaching either end, whereas a gauge of an incline guide display of the pitch direction Gp2 assumes a form wherein a width thereof has a uniform dimension along a length thereof as an instance thereof, such as is depicted in FIG. 14. In such a circumstance, as an instance thereof, the incline guide wherein both ends are wider than the center is the incline guide display of the roll direction Gr2, and the incline guide wherein the width thereof is uniform along the length thereof is the incline guide display of the pitch direction Gp2, even when the direction of the imaging apparatus changes from the landscape direction as depicted in FIG. 14 to the portrait direction. By thus differentiating between the display format of the gauge of the incline display thereof, it is possible to intuitively comprehend a relation between each respective incline guide gauge and the roll angle and the pitch angle, even when the horizontal and vertical direction is inverted as described herein.

It is to be understood that, according to the ninth embodiment and the tenth embodiment, an implementation would be possible with respect to the configuration that is depicted in FIG. 1 and FIGS. 2A and 2B when a display of the incline guide display of the pitch direction is not absolutely necessary, by installing a device that switches off the incline guide display of the pitch direction by way of a setting of a program thereof. Put another way, such as displaying a screen upon the display device, such as the LCD monitor 5, that sets whether or not to display each respective gauge thereof, storing, in an EEPROM or a main memory, a result of performing a setting thereof, using such as a console button (not shown), and performing the display in accordance with a content of the setting thereof that is called when executing the display, would be permissible herein.

Eleventh Embodiment

Following is a description of an eleventh embodiment of the present invention, which is predicated upon employing an acceleration sensor comprising two axes that are mutually orthogonal thereto as the acceleration sensor 111 with respect to the imaging apparatus described herein to display the incline guide display of the roll angle of the imaging apparatus only when the pitch angle of the imaging apparatus falls within a prescribed range.

The acceleration sensor 111 is incorporated into a main printed circuit board (PCB) wherein is incorporated such as the processor 104, or put another way, the acceleration sensor 111 is incorporated vertically upon the main circuit board with respect to the imaging apparatus. The acceleration sensor thus built into the main circuit board outputs a data of two orthogonal axes, the X-axis and the Y-axis, as well as a data of a temperature T. The incline of the imaging apparatus is computed from the data thus outputted, and the incline guide display that corresponds to the incline thus computed is displayed upon such as the LCD monitor 5.

A roll angle θ of the acceleration sensor 111 with respect to the horizontal is derived with the equation (1) described herein, and a pitch angle φ of the acceleration sensor 111 with respect to the horizontal is derived with the equation (2), as follows:

$$\phi[deg]=180/\pi * \arctan(Gz/Gxy)$$

$$Gz=\text{sqrt}(Gxyz^2-Gxy^2)$$

$$Gxy=\text{sqrt}\{(X-X0)^2+(Y-Y0)^2\} \quad (2)$$

wherein "Gxyz" is an output value at 1G, and "X0" and "Y0" is an output when a gravity thereof is zero, respectively.

Figure 15A:
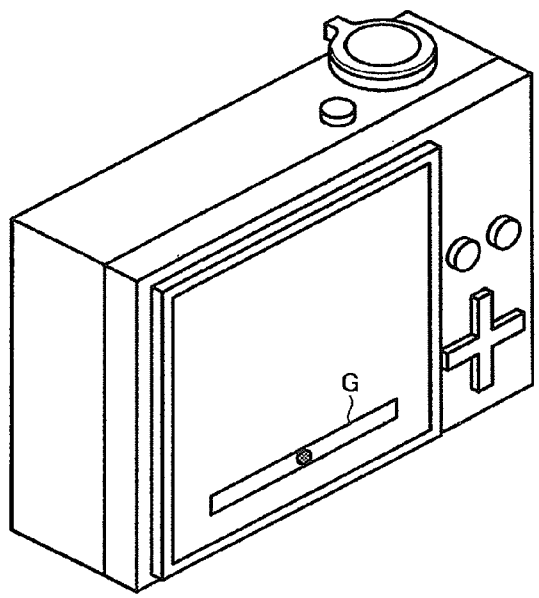
FIG. 15A is an oblique external view of a digital camera whereupon a display format of an incline guide display of a monitor display in a landscape view circumstance is depicted by an imaging apparatus according to an eleventh embodiment of the present invention.
Figure 15B:
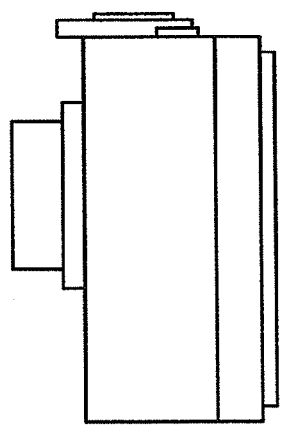
FIG. 15B is a lateral external elevation view of the digital camera that is depicted in FIG. 15A.
Figure 16A:
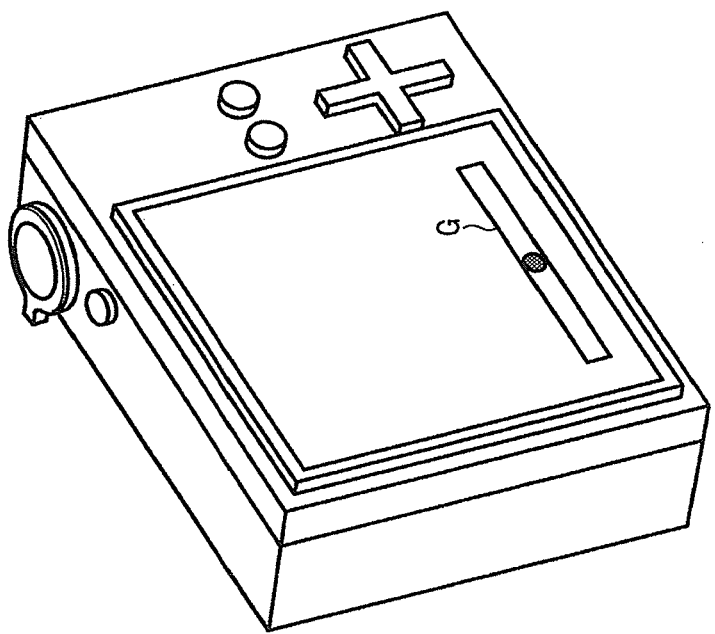
FIG. 16A is an oblique external view of the digital camera whereupon the display format of the incline guide display of the monitor display in the landscape view circumstance is depicted by the imaging apparatus according to the eleventh embodiment of the present invention.
Figure 16B:
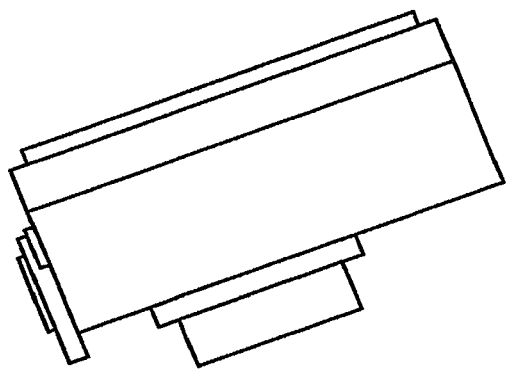
FIG. 16B is an oblique lateral external view of the digital camera that is depicted in FIG. 16A.
Figure 18A:
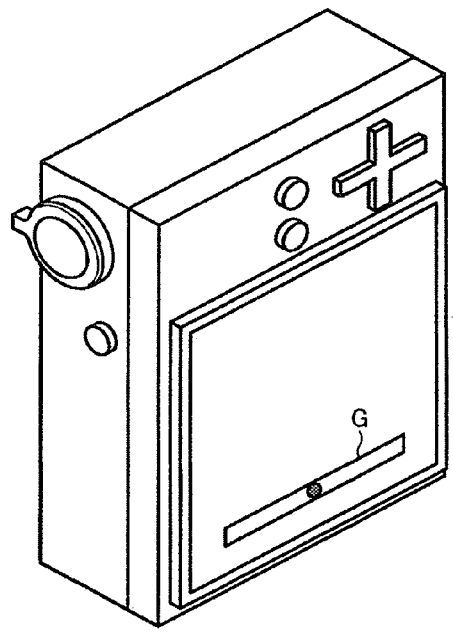
FIG. 18A is an oblique external view of a digital camera whereupon a display format of an incline guide display of a monitor display in a portrait view circumstance is depicted by the imaging apparatus according to the eleventh embodiment of the present invention.
Figure 18B:
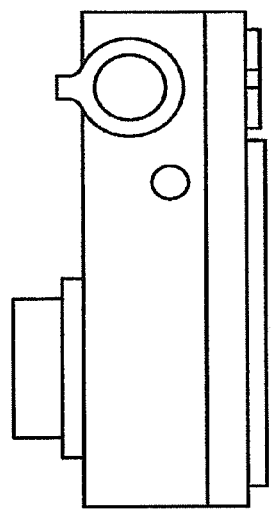
FIG. 18B is an oblique external top view of the digital camera that is depicted in FIG. 18A.
Figure 19A:
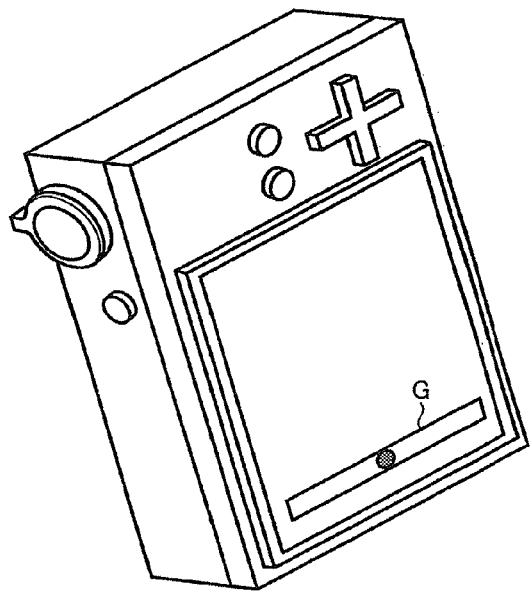
FIG. 19A is an oblique external view of the digital camera whereupon the display format of the incline guide display of the monitor display in the portrait view circumstance is depicted by the imaging apparatus according to the eleventh embodiment of the present invention.
Figure 19B:
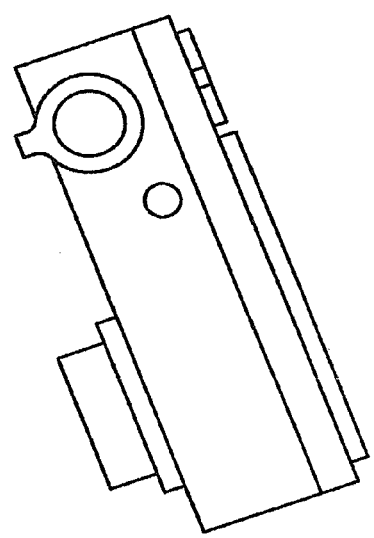
FIG. 19B is an oblique external top view of the digital camera that is depicted in FIG. 19A.

The acceleration sensor 111 is incorporated vertically with respect to the imaging apparatus. More concretely, as an instance thereof, the acceleration sensor 111 is incorporated vertically upon a rightmost and a lowermost component of the main circuit board as seen from a rear surface of the imaging apparatus, although it is not essential that the acceleration sensor 111 necessarily be located thereupon. When the pitch angle is increased in such a state, the outputted value of the X-axis and the Y-axis that is outputted from the acceleration sensor 111 gradually get smaller, and it becomes easier for the outputted value thereof to be affected by a noise or an offset misalignment. Put another way, the greater the pitch angle, the lower the accuracy of the display the roll angle. Accordingly, when the pitch angle reaches a given angle in degrees, such as is depicted in FIG. 15 to FIG. 17 and FIG. 18 to FIG. 20, an alert to a condition thereof is given by such as causing the display to flicker, turning off the marker that is displayed upon the bar that denotes the angle thereupon, or sounding an alert sound, as an instance thereof. FIG. 15 to FIG. 17 depict a state wherein the imaging apparatus is in the landscape direction. FIG. 15 depicts a state wherein the imaging apparatus is close to plumb, FIG. 16 depicts a state wherein a moderate pitch angle is applied to the imaging apparatus, and FIG. 17 depicts a state wherein a large pitch angle is applied to the imaging apparatus and an incline guide display G of the roll angle flickers in order to provide an alert of the large pitch angle thus applied thereto. FIG. 18 to FIG. 20 depict a state wherein the imaging apparatus is in the portrait direction. FIG. 18 depicts a state wherein the imaging apparatus is close to plumb in the portrait direction, FIG. 19 depicts a state wherein a moderate pitch angle is applied to the imaging apparatus, and FIG. 20 depicts a state wherein a large pitch angle is applied to the imaging apparatus and an incline guide display G of the roll angle flickers in order to provide an alert of the large pitch angle thus applied thereto.

Twelfth Embodiment

Following is a description of a twelfth embodiment of the present invention, which is predicated upon displaying the incline guide display of the roll angle of the imaging apparatus only when the temperature of the imaging apparatus falls within a prescribed range.

The output value of the X-axis and the Y-axis of the acceleration sensor 111 changes in accordance with a change in the temperature. As an instance thereof, increasing the temperature causes the outputted value of the X-axis and the Y-axis that is outputted from the acceleration sensor 111 to gradually get smaller, and it becomes easier for the outputted value thereof to be affected by the noise the offset misalignment in such a circumstance. Accordingly, when the outputted temperature T of the acceleration sensor 111 reaches an outputted value of a temperature that exceeds a defined range thereof, an alert to a condition thereof is given by such as causing the display that displayed either the pitch angle or the roll angle theretofore to flicker, turning off the marker M that is displayed upon the bar thereupon, or sounding an alert sound.

In such a circumstance as well as the circumstance according to the eleventh embodiment, the display state thereof would be practically identical to the circumstance that is depicted in FIG. 17 to FIG. 20, as an instance thereof.

Thirteenth Embodiment

Following is a description of a thirteenth embodiment of an imaging apparatus according to the present invention.

Figure 21A:
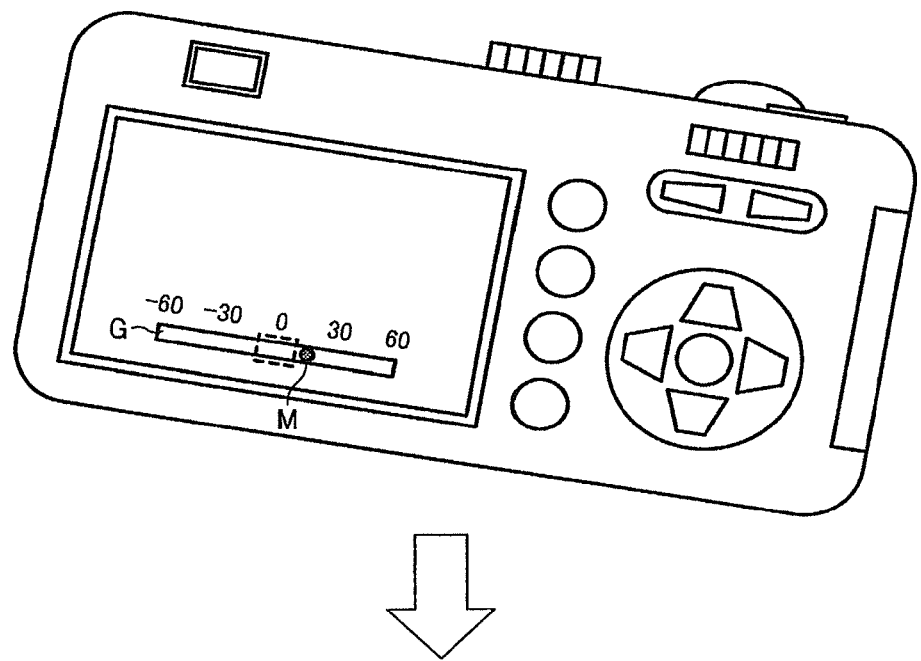
FIG. 21A and FIG. 21B are views showing a change in a display state of an incline guide display of a monitor display with respect to an imaging apparatus according to a thirteenth embodiment of the present invention.
Figure 21B:
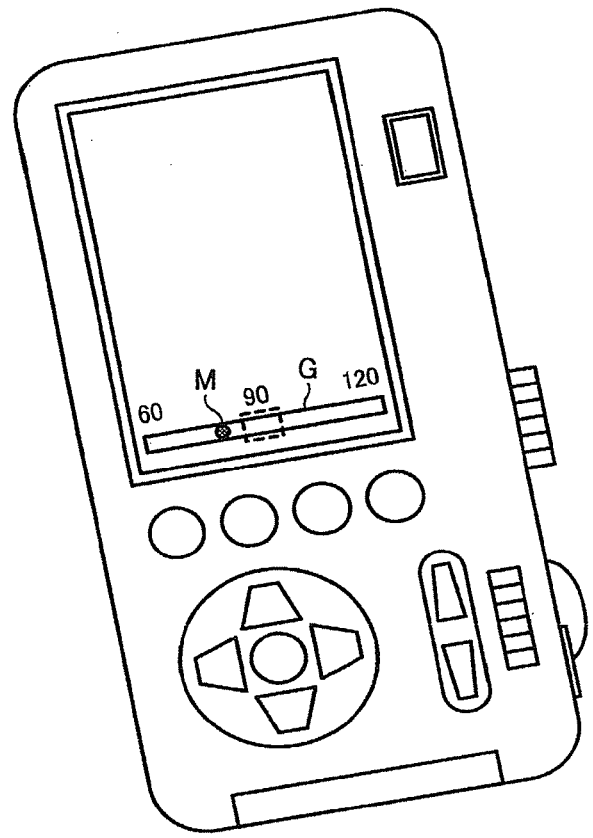
Figure 22:
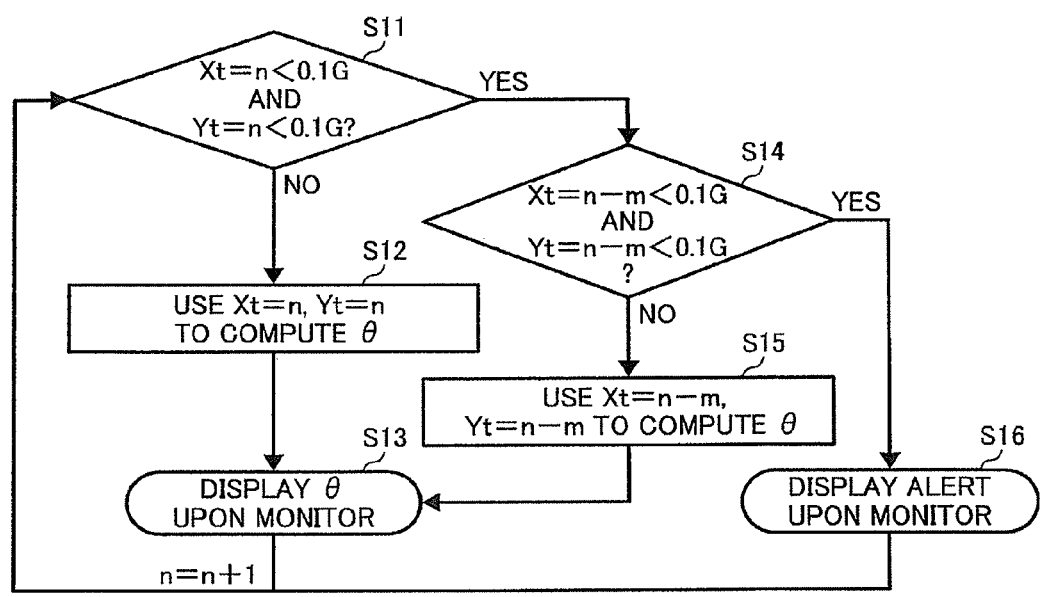
FIG. 22 is a flowchart that describes a control of the display state of the incline guide display of the monitor display with respect to the imaging apparatus according to the thirteenth embodiment of the present invention.

With respect to the imaging apparatus described herein, when the pitch angle is increased such that the imaging apparatus is in a state of being laid face down, the X and the Y both go to zero-G, and thus, it is impossible to compute the roll angle therefrom. The outputted value of both the X and the Y decline as the X and the Y approach the zero-G state, and thus, the accuracy thereof worsens. Accordingly, when changing a location of the display bar of the incline guide display G by the angle of the imaging apparatus, such as is depicted in FIG. 21A and FIG. 21B, it is not possible to determine whether to position the location of the display bar of the incline guide display G along the lengthwise direction, such as is depicted in FIG. 21A, or along the non-lengthwise direction, such as is depicted in FIG. 21B, when the X and the Y approach the zero-G, for instance, less than to a threshold value of 0.1 G. The display method thereof in such a circumstance is denoted by a flowchart that is depicted in FIG. 22.

In step S11, a determination is made as to whether or not an outputted value Xt=n and Yt=n, when t=n, is respectively less than 0.1 G, and if both Xt=n and Yt=n is not less than 0.1 G, then, in step S12, the outputted value Xt=n and Yt=n is employed as is to calculate the angle θ, which is displayed upon the monitor in step S13.

If, however, the outputted value Xt=n and Yt=n is both less than 0.1 G, then, in step S14, a determination is made as to whether or not the outputted value of the X and the Y is less than 0.1 G at a time m seconds prior to a present time, and if both the outputted value of the X and the Y is not less than 0.1 G at the time m seconds prior to the present time, then, in step S15, a determination of the angle θ is made from an outputted value Xt=n−m and Yt=n−m at the time m seconds prior to the present time wherein the X and the Y is not less than 0.1 G, whereupon the process proceeds to step S13, wherein the angle θ thus determined is displayed upon the monitor. In such a circumstance, the location of the incline guide display bar is fixed until either of the outputted value is greater than or equal to 0.1 G, thereby avoiding making the bar hard to view by avoiding changing the location of the bar indiscriminately. A similar circumstance applies in a playback thereof, whereas, when rotating the display direction thereof by the angle of the imaging apparatus, it is not possible to determine which way to rotate the image when the imaging apparatus is in the state of being laid face down, the display direction thereof is changed by a process that is similar to the process that is applied to the display bar of the monitoring. It is to be understood that, in a circumstance wherein the Xt=n−m and the Yt=n−m must both be less than 0.1 G, regardless of the value of m, then, in step S16, an alert display is performed in a manner that is approximately identical to the form of the alert according to the eleventh embodiment.

Fourteenth Embodiment

Following is a description of a fourteenth embodiment of an imaging apparatus according to the present invention.

In the circumstance wherein the alert display is performed, owing to the pitch angle being applied to the imaging apparatus, and the output value of both the X and the Y being less than the threshold value, a necessity for obtaining the high degree of accuracy is obviated, and thus, the sampling quantity is reduced, a processing load is prevented from being placed upon such as the processor 104, and a power consumption thereof is reduced.

According to the present invention, it is possible to provide an imaging apparatus that is capable of implementing a user interface that improves a usability thereof by separating focusing on an accuracy thereof versus improving an ease of use thereof, according to a range wherein the accuracy is demanded and a range wherein the accuracy is not demanded, in accordance with an incline of the imaging apparatus.

More specifically, it is possible, by way of the imaging apparatus according to the present invention, to provide a user-friendly user interface by accurately changing a dynamic range of an incline guide display in response to a magnitude of an angle of the incline of the imaging apparatus, by changing a display state of the incline guide display in response to a magnitude of the incline thereof. As an instance thereof, it would be possible for a user to ascertain the angle of the incline of the imaging apparatus with ease and accuracy with respect to a range wherein the accuracy of the incline guide display is necessary to the user, while allowing a general and rapid display of the incline guide display within a range wherein the accuracy thereof is not necessary to the user.

By detecting, at least one roll angle or pitch angle of the imaging apparatus, the incline detection device is capable of detecting either or both of the roll angle and/or the pitch angle thereof when the imaging apparatus performs a rolling operation, i.e., an operation of inclining to the left or the right, and/or a pitching operation, i.e., an operation of inclining forward or backward, and is thus capable of accurately ascertaining the incline guide display that corresponds to the roll angle and/or the pitch angle thus detected by changing the dynamic range thereof in accordance with the magnitude of the incline angle thereof.

By selectively displaying the incline guide display that corresponds to the incline information of either or both of the roll angle or the pitch angle, the display processing apparatus is capable of allowing the user to select at will whether to consider only the roll angle, only the pitch angle, or both the roll angle and the pitch angle, allowing the user to treat the imaging apparatus as being extremely user-friendly.

The display processing apparatus is of ascertaining, clearly and accurately, the roll angle and/or the pitch angle by way of the incline guide display, by causing the incline guide display thereof to display the roll angle and/or the pitch angle with a different display range in accordance with the magnitude of the roll angle and/or the pitch angle, as well as causing the incline guide thereof to be displayed thereupon with a different display color thereof, respectively.

The incline display guide is formed from a display scale, which is, for example, in a linear shape, and a marker thereupon, a display location thereof moving along the display scale in accordance with the incline angle. It is possible to easily and intuitively ascertain the roll angle and/or the pitch angle by way of the linearly shaped display scale and the marker thereupon, the display location whereof moves along the display scale in accordance with the incline angle, by way of the display processing device displaying the display scale as a landscape state and/or a portrait state thereof in alignment with an edge portion of a horizontal direction and/or a vertical direction of a display screen of the image display device.

When it is determined that the roll angle and/or the pitch angle is within a prescribed narrow range, and that the imaging apparatus is in a substantially horizontal state, it is possible for the user to accurately verify the degree of the horizontal upon a display scale whereupon a range of the scale is enlarged, thus allowing the user to identify the angle, in degrees, with a high degree of precision, when it is necessary to maintain the imaging apparatus in a maximally horizontal direction.

When it is determined that the roll angle and/or the pitch angle is within a prescribed narrow range, and that the imaging apparatus is in the substantially horizontal state, slowly changing a display updating speed of the incline guide display allows accelerating a response when the imaging apparatus inclines to a greater magnitude than a prescribed quantity by increasing a response speed thereof, and conversely, allows the user to align the imaging apparatus more easily with the horizontal when the imaging apparatus is close to a horizontal state by reducing the response speed thereof.

When an incline angle obtained from the incline information is within a range close to zero degrees or close to 90 degrees, the incline detection device detects the incline of the imaging apparatus with an increased sampling quantity or increasing the sampling quantity of the detection data of the incline detection apparatus and performing the angle display with the high degree of precision increases the precision when the imaging apparatus is in the state of being either close to the horizontal or close to the vertical, and reducing the sampling quantity and the average processing quantity when the imaging apparatus is in the state of being inclined greater than the prescribed quantity facilitates instantaneously ascertaining the approximate incline of the imaging apparatus.

An imaging apparatus, comprising an imaging element that converts an optical image into a digital image information, an imaging processing device that acquires an image information by way of the imaging element, an incline detection device that detects an incline of the imaging apparatus, an image display device that displays an image that is thus imaged thereby, an incline computation device that computes an incline information that corresponds to a magnitude of the incline thus detected, in accordance with a detection data that is obtained by the incline detection device, an information storage device that stores the incline information that is computed by the incline computation device, and a display processing device that composites an incline guide display, which corresponds to the incline information thus computed and stored, upon a screen of the image display device, and that displays the display thus composited together with the image that is imaged by the imaging apparatus, allows a user reading the angle with a high degree of precision when the imaging apparatus is either close to the horizontal or close to the vertical, wherein the high degree of precision is required of the display scale, and is capable of a general display when either the roll angle or the pitch angle is not required, by the display scale of the incline guide display that corresponds to the incline information that is displayed by the display processing device being a nonlinear scale. A need to switch between a plurality of the incline guide display is thus eliminated, allowing the configuration of the imaging apparatus to be simplified, and a cost thereof to be kept under control.

The incline guide display is formed from a display scale, which is in a linear shape, and a marker thereupon, a display location thereof moving along the display scale in accordance with the incline angle. It is possible to easily and intuitively ascertain the roll angle and/or the pitch angle by way of the linearly shaped display scale and the marker thereupon, the display location whereof moves along the display scale in accordance with the incline angle, by way of the display processing device displaying the display scale as a landscape state and/or a portrait state thereof in alignment with an edge portion of a horizontal direction and/or a vertical direction of a display screen of the image display device.

When it is determined that the roll angle and/or the pitch angle is within a prescribed narrow range, and that the imaging apparatus is in the substantially horizontal state, slowly changing a display change speed of the incline guide display allows accelerating a response when the imaging apparatus inclines to a greater magnitude than a prescribed quantity by increasing a response speed thereof, and conversely, allows the user to align the imaging apparatus more easily with the horizontal when the imaging apparatus is close to a horizontal state by reducing the response speed thereof.

When the roll angle and/or the pitch angle is within a range of being close to zero degrees and/or close to 90 degrees, increasing the sampling quantity of the detection data of the incline detection apparatus and performing the angle display with the high degree of precision increases the precision when the imaging apparatus is in the state of being either close to the horizontal or close to the vertical, and reducing the sampling quantity when the imaging apparatus is in the state of being inclined greater than the prescribed quantity facilitates instantaneously ascertaining the approximate incline of the imaging apparatus.

Using a logarithm for the display scale of the incline guide display allows closely reading the angle when the angle or roll or the pitch angle is extremely close to zero degrees, such as within ±one degree of zero degrees, i.e., a minute range, whereas when the angle or roll or the pitch angle is greater than ±one degree of zero degrees, the logarithmic scale allows generally reading the angle within a wider range thereof, thereby allowing performing the display of the roll angle in a rational manner.

Using an exponent for the display scale of the incline guide display allows closely reading the angle when the angle or roll or the pitch angle is extremely close to zero degrees, such as within ±one degree of zero degrees, i.e., a minute range, whereas when the angle or roll or the pitch angle is greater than ±one degree of zero degrees, the exponential scale allows generally reading the angle within a wider range thereof, thereby allowing performing the display of the roll angle in a rational manner.

By changing the display location indicating the incline in the incline guide display is changed in accordance with the incline of the imaging apparatus, the incline guide display is capable of changing the display scale to a maximally viewable location when the imaging apparatus is in the horizontal direction, as well as in the vertical direction or close thereto, thus allowing improving the usability thereof.

It is possible for the incline detection device, by being the acceleration sensor, to detect the incline angle with a high degree of responsiveness and precision with respect to the incline of the imaging apparatus.

The incline detection device includes a device that detects an incline that includes the roll angle and the pitch angle of the imaging apparatus, the incline computation device includes a device that computes the information of the roll angle and the pitch angle of the imaging apparatus, in accordance with the detection data that is obtained with the incline detection device, and the display processing device includes a device that displays both the incline guide display that corresponds to the roll angle and the incline guide display that corresponds to the pitch angle upon the image display device, thereby allowing effectually avoiding the incline of the imaging apparatus in the pitch direction when taking a photograph, allowing taking a plurality of images with the pitch angle and the roll angle being aligned therewith, during such as a panorama photography, as an instance thereof.

The incline computation device includes a device that determines whether the imaging apparatus is positioned in the horizontal direction or the vertical direction, in accordance with the detection data that is obtained with the incline detection device, and computes the incline information of the roll angle and the pitch angle of the imaging apparatus with respect to the horizontal direction and the vertical direction thereof, and the display processing device includes a device configured to display the incline guide display of the roll angle and the pitch angle in a display position differently when the imaging apparatus is positioned in the horizontal direction, from a display position when the imaging apparatus is positioned in the vertical direction, in accordance with the information that is obtained with the incline computation device, thereby allowing a photographer to precisely ascertain the incline of the roll direction and the pitch direction of the imaging apparatus when the imaging apparatus is positioned in the vertical direction, as well as in the regular horizontal direction thereof.

The display processing device includes a device that displays the incline display guide of the roll angle and the pitch angle with a different color thereof, respectively, thereby allowing the photographer to ascertain the incline of the roll direction and the pitch direction of the imaging apparatus with ease.

The display processing device includes a device that displays the incline display guide of the roll angle and the pitch angle with a different shape thereof, respectively, thereby allowing the photographer to ascertain the incline of the roll direction and the pitch direction of the imaging apparatus precisely and with ease.

The display processing device includes a device that causes either the incline display guide of the roll angle or the incline display guide of the pitch angle, at a minimum, to not be displayed, in accordance with a preference of the photographer, thereby allowing the photographer to ascertain the incline of either the roll direction or the pitch direction of the imaging apparatus, whichever is required in a given circumstance, with ease and reliability.

The incline detection device is an acceleration sensor that detects a slope of three axes that are all orthogonal to one another, thereby allowing detecting the incline angle with a high degree of responsiveness and precision with respect to the incline of any and all directions and directions of the imaging apparatus.

The incline detection device includes a device that detects an incline that includes the roll angle and the pitch angle of the imaging apparatus, the incline computation device includes a device that computes the incline information of the roll angle and the pitch angle of the imaging apparatus, in accordance with the detection data that is obtained with the incline detection device, and the display processing device includes a device that displays upon the image display device the incline guide display that corresponds to the roll angle, at a minimum, from among the incline guide display that respectively corresponds to the roll angle and the pitch angle, and which changes the display state of the incline guide display of the roll angle when the pitch angle reaches or exceeds a prescribed value thereof, in accordance with the incline information of the roll angle and the pitch angle that is obtained with the incline computation device, thereby allowing reliably ascertaining, by way of the incline guide display thereof, when the range of the pitch angle wherein it is possible to maintain the precision of the incline detection thereof is exceeded, and making possible a use thereof within the range of the pitch angle wherein it is possible to maintain the precision of the incline detection thereof, with ease.

The display processing device includes a device that changes the incline guide display of the roll angle to a display state that includes an alert when the pitch angle reaches or exceeds the prescribed value, thereby making possible a use thereof within the range of the pitch angle wherein it is possible to maintain the precision of the incline detection thereof, with a further ease therein, by way of the alert display thereof.

The display processing device includes a device that causes a portion of the incline display guide of the roll angle, at a minimum, to not be displayed when the pitch angle reaches or exceeds the prescribed value, thereby allowing reliably ascertaining, by way of presence or absence of the incline guide display thereof, when the range of the pitch angle wherein it is possible to maintain the precision of the incline detection thereof is exceeded, and making possible a use thereof within the range of the pitch angle wherein it is possible to maintain the precision of the incline detection thereof, with ease.

The display processing device includes a device that controls so as to change the display format of the incline display guide of the roll angle when the pitch angle is within a range that is close to ±90 degrees, thereby allowing reliably ascertaining, by way of the incline guide display thereof, when a range of the pitch angle is entered wherein it is not possible to maintain the precision of the incline detection thereof, and making possible a use thereof within the range of the pitch angle wherein it is possible to maintain the precision of the incline detection thereof, reliably and with ease.

The imaging apparatus further includes a temperature detection device that detects a temperature in a near vicinity of the incline detection device, and the display processing device includes a device that changes the display format of the incline display guide when the temperature that is detected by the temperature detection device exceeds a prescribed range, thereby allowing reliably ascertaining, by way of the incline guide display thereof, when the range of the temperature is exceeded wherein it is possible to maintain the precision of the incline detection thereof, and making possible a use thereof within the range of the temperature wherein it is possible to maintain the precision of the incline detection thereof, with ease.

The display processing device includes a device that changes the incline guide display to a display state that includes an alert when the detected temperature exceeds the prescribed range, thereby making possible a use thereof within the range of the temperature wherein it is possible to maintain the precision of the incline detection thereof, with a further ease therein, by way of the alert display thereof.

The display processing device includes a device that causes a portion of the incline display guide of the roll angle, at a minimum, to not be displayed when the detected temperature exceeds the prescribed range, thereby allowing reliably ascertaining, by way of presence or absence of the incline guide display thereof, when the range of the temperature wherein it is possible to maintain the precision of the incline detection thereof is exceeded, and making possible a use thereof within the range of the temperature wherein it is possible to maintain the precision of the incline detection thereof, with ease.

When the display format of the incline guide display is changed by the display processing device, the further inclusion of a device that changes a control of the incline detection device allows reliably ascertaining, by way of the incline guide display thereof, when the range of the temperature is exceeded wherein it is possible to maintain the precision of the incline detection thereof, and making possible a use thereof within the range of the temperature wherein it is possible to maintain the precision of the incline detection thereof, reliably and with ease.

When the display format of the incline guide display is changed by the display processing device, the device that changes the control of the incline detection device reduces the sampling quantity of the incline with respect to the incline detection device, thus controlling so as to reduce a load of the incline processing, thereby making possible a simplification of the process that relates to the incline guide display and a use thereof within a range wherein it is possible to efficiently maintain the precision of the incline detection thereof.

The display processing device changes the display location of the incline guide display that is displayed upon the display screen of the display device in accordance with the magnitude of the incline of the imaging apparatus that is in turn derived by way of the incline computation device, thereby allowing the photographer to precisely ascertain the incline of the roll direction and the pitch direction of the imaging apparatus when the imaging apparatus is positioned in the vertical direction, as well as in the regular horizontal direction thereof.

The incline detection device is either an acceleration sensor comprising two axes or an acceleration sensor comprising three axes, thereby allowing detecting the incline angle with a high degree of responsiveness and precision with respect to the incline of a wide range of directions and directions of the imaging apparatus.

What is claimed is:

1. An imaging apparatus comprising:
    an imaging element;
    an imaging processing device which acquires an image data from the imaging element;
    an incline detection device which detects an incline of the imaging apparatus;
    an image display device which displays an image based on the image data; and
    a display processing device which displays an incline guide display in accordance with an amount of roll angle of the imaging apparatus on the image display device;
    wherein when an amount of pitch angle of the imaging apparatus exceeds a threshold value, the display processing device changes a display format of the incline guide display from a first format to a second format, and wherein the second format is different from the first format; and
    wherein the imaging apparatus is configured to make a determination as to whether the amount of pitch angle exceeds or does not exceed the threshold value, and wherein the imaging apparatus is configured to control the display processing device based on the determination, such that when the imaging apparatus determines that the amount of pitch angle does not exceed the threshold value, then the display format of the incline guide display is the first format, and such that the display format of the incline guide display is the second format only when the imaging apparatus determines that the amount of pitch angle does exceed the threshold value, and wherein the change of the display format of the incline guide display from the first format to the second format includes turning off a marker, allowing a bar to flicker, or sounding an alert sound.

2. The imaging apparatus according to claim 1, wherein the incline guide display includes a horizontal bar and a marker which moves in accordance with a change in the amount of roll angle of the imaging apparatus.

3. The imaging apparatus according to claim 1, wherein the change of the display format of the incline guide display is configured so as not to display at least one portion of the incline guide display of the amount of roll angle of the imaging apparatus.

4. An imaging apparatus comprising:
    an imaging element;
    an imaging processing device which acquires an image data from the imaging element;
    an incline detection device which detects an incline of the imaging apparatus;
    an image display device which displays an image based on the image data; and
    a display processing device which displays an incline guide display in accordance with an amount of roll angle of the imaging apparatus on the image display device;
    wherein when an amount of pitch angle of the imaging apparatus exceeds a threshold value, the display processing device changes a display format of the incline guide display;
    wherein the incline guide display includes a horizontal bar and a marker which moves in accordance with a change in the amount of roll angle of the imaging apparatus; and
    wherein the change of the display format of the incline guide display includes turning off the marker, allowing the bar to flicker, or sounding an alert sound.

5. The imaging apparatus according to claim 4, wherein the display format of the incline guide display is changed when the incline of pitch is within a range close to ±90 degrees.

6. The imaging apparatus according to claim 1, wherein the incline guide display displays both the incline guide display that corresponds to the amount of roll angle and the incline guide display that corresponds to the amount of pitch angle on the image display device.

7. The imaging apparatus according to claim 1, further comprising, based on the detection data detected by the incline detection device, a device that determines whether the imaging apparatus is positioned in a horizontal direction or vertical direction and that displays one of a display position when the imaging apparatus is positioned in the horizontal direction and a display position when the imaging apparatus is positioned in the vertical direction, differently from the other.

8. The imaging apparatus according to claim 1, wherein the display processing device displays respectively the incline guide display that corresponds to the amount of roll angle and the incline guide display that corresponds to the amount of pitch angle with a different shape.

9. The imaging apparatus according to claim 6, wherein the display processing device is configured so as not to display at least one of the incline guide display in accordance with the amount of roll angle and the incline guide display in accordance with the amount of pitch angle.

* * * * *